(12) United States Patent
Dammertz et al.

(10) Patent No.: US 8,259,106 B2
(45) Date of Patent: Sep. 4, 2012

(54) LOW-DIMENSIONAL RANK-1 LATTICES IN COMPUTER IMAGE SYNTHESIS

(75) Inventors: Sabrina Dammertz, Ulm (DE); Holger Dammertz, Ulm (DE); Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 616 days.

(21) Appl. No.: 12/416,236

(22) Filed: Apr. 1, 2009

(65) Prior Publication Data

US 2009/0244084 A1 Oct. 1, 2009

Related U.S. Application Data

(63) Continuation-in-part of application No. 11/474,091, filed on Jun. 23, 2006, now Pat. No. 7,589,729, and a continuation-in-part of application No. 10/439,311, filed on May 15, 2003, now abandoned.

(60) Provisional application No. 61/042,135, filed on Apr. 3, 2008, provisional application No. 61/078,351, filed on Jul. 4, 2008, provisional application No. 60/693,232, filed on Jun. 23, 2005, provisional application No. 60/378,115, filed on May 15, 2002.

(51) Int. Cl.
*G06T 17/00* (2006.01)
(52) U.S. Cl. .................... 345/420; 345/582; 345/583
(58) Field of Classification Search .................. 345/420, 345/582, 583
See application file for complete search history.

(56) References Cited

U.S. PATENT DOCUMENTS

| | | | |
|---|---|---|---|
| 6,507,676 B1 | 1/2003 | Harrington | |
| 2001/0051001 A1* | 12/2001 | Nakamura et al. | 382/154 |
| 2007/0046686 A1 | 3/2007 | Keller | |
| 2007/0109320 A1 | 5/2007 | Skibak et al. | |
| 2009/0141026 A1 | 6/2009 | Raab et al. | |

FOREIGN PATENT DOCUMENTS

| | | |
|---|---|---|
| WO | 03098467 A3 | 11/2003 |
| WO | 2007/002592 | 1/2007 |
| WO | 2007002592 A2 | 1/2007 |

OTHER PUBLICATIONS

Middleton et al. "Framework for practical hexagonal-image processing", Journal of Electronic Imaging, Jan. 2002, pp. 1, 3-4.*
Intellectual Property Office, Search Report, Aug. 5, 2009, UK.

(Continued)

*Primary Examiner* — Maurice L McDowell, Jr.
(74) *Attorney, Agent, or Firm* — Jacobs & Kim LLP; David Jacobs

(57) ABSTRACT

Methods, systems and computer program code (software) products executable in a digital processor operable to generate a synthetic image include (1) selecting a rank-1 lattice in accordance with a maximized minimum distance function (max-min-dist lattice) corresponding to points in the synthetic image to be generated; (2) generating a data structure for efficient access of data stored in points of the rank-1 lattice, the data structure including the number n of lattice points, generator vector g, s basis vectors, and indices of the basis vectors, wherein the basis vectors are lattice points, and (3) generating, using the rank-1 lattice, digital output representative of a synthetic image, wherein the generating includes using the layout of rank-1 lattice points to represent textures of arbitrary dimension.

42 Claims, 25 Drawing Sheets

OTHER PUBLICATIONS

Agrell, E. et al., "Closest Point Search in Lattices," IEEE Transactions on Information Theory, vol. 48, No. 8, pp. 2201-2214 (2002).

Bando, Y. et al., "Hexagonal Storage Scheme for Interleaved Frame Buffers and Textures," HWWS '05: Proceedings of the ACM SIGGRAPH/Eurographics Conference on Graphics Hardware, pp. 33-40 (ACM, New York, NY, 2005).

Cools, R. et al., "Different Quality Indexes for Lattice Rules," J. Complex., vol. 13, No. 2, pp. 235-258 (1997).

Dammertz, S. et al., "Image Synthesis by Rank-1 Lattices," Monte Carlo and Quasi Monte Carlo Methods 2006, pp. 217-236 (Springer, 2008).

Dammertz, S. et al., "Efficient Search for Low-Dimensional Rank-1 Lattices to Approximate Spectra," Talk Submitted to Monte Carlo and Quasi-Monte Carlo Methods (2008).

Dammertz, S. et al, "Efficient Search for Low-Dimensional Rank-1 Lattices with Applications in Graphics," Monte Carlo and Quasi-Monte Carlo Methods 2008.

Dammertz, H. et al., "Simulation on Rank-1 Lattices," Monte Carlo and Quasi-Monte Carlo Methods 2006, pp. 205-216 (Springer, 2008).

Jodoin P.-M. et al., "Halftoning over a Hexagonal Grid" Proc. SPIE, vol. 5008, 443 (2003).

Lau, D. et al., "Blue-Noise Halftoning for Hexagonal Grids," Hpl-2004-232, Imaging Systems Laboratory, HP Laboratories (Cambridge, 2004).

Lemieux, C., "L'utilisation de règles de réseau en simulation comme technique de réduction de la variance," Ph.D. Thesis, Université de Montréal (2000).

Lemieux, C. et al., "Using Lattice Rules for Variance Reduction in Simulation," Simulation Conference Proceedings, 2000, Winter, vol. 1, pp. 509-516 (2000).

Middleton, L. et al., Hexagonal Image Processing: A Practical Approach (Advances in Pattern Recognition) (Springer-Verlag New York, Inc., Secaucus, NJ, 2005).

Niederreiter, H., "Random Number Generation and Quasi-Monte Carlo Methods," CBMS-NSF Regional Conference Series in Applied Mathematics, vol. 63 (Society for Industrial and Applied Mathematics, Philadelphia, 1992).

Peachy, D., "Texture on Demand," Pixar Animation Studios—Technical Memo #217 (1990).

Petersen, D., "Sampling and Reconstruction of Wave-Number-Limited Functions in n-Dimensional Euclidean Spaces," Information and Control, vol. 5, No. 4, pp. 279-323 (1962).

Rodriguez, J. et al., "Optimal Halftoning over Hexagonal Grids," Proc. SPIE, vol. 6058, pp. 313-324 (2006).

Sloan, I. et al., "Lattice Methods for Multiple Integration" (Clarendon Press, Oxford, 1994).

Skibak, S., "Image Synthesis by Rank-1 Lattices," Master's Thesis, Ulm University (2005).

Van De Ville, D., "Hex-Splines: A Novel Spline Family for Hexagonal Lattices," IEEE Transactions on Image Processing, vol. 13, No. 6, pp. 758-772 (2004).

Van De Ville, D. et al., "Image Resampling between Orthogonal and Hexagonal Lattices," Proceedings, 2002 International Conference on Image Processing, vol. 3, pp. 389-392 (2002).

Yellot, J., "Spectral Consequences of Photoreceptor Sampling in the Rhesus Retina," Science, vol. 221, pp. 382-385 (1983), submitted to Eurographics 2008.

Condat, "Quasi-Interpolating Spline Models", May 2007, IEEE Image Processing, vol. 16(5).

* cited by examiner

100a $k = 0$

100b $k = 1$

100c $k = 2$

100d $k = 3$

140

```
varying vec4 uv;              // 2d texture coordinate
uniform sampler2D r1data;     // r1-image (as 1d array)
uniform vec4 L;               // lattice parameters (n,sN,g,d)
uniform vec4 b;               // basis vectors for L void main(void)
{
    // anchor point of Delaunay cell
    vec2 ft = floor(vec2(uv.x * b.q - uv.y * b.p,
                         uv.y * b.s - uv.x * b.t)*L.w);

// 4 indices of the 4 corner points
    vec4 idx = mod(vec4(ft.x*b.s+ft.y*b.p,
                        (ft.x+1.0)*b.s+ft.y*b.p,
                        (ft.x+1.0)*b.s+(ft.y+1.0)*b.p,
                        ft.x*b.s+(ft.y+1.0)*b.p), L.x);

// corner points in Cartesian coordinates
    vec4 px = idx/L.x;
    vec4 py = mod((idx*L.z)/L.x, 1.0);

// squared distance to the 2d texture coordinate
    vec4 dp = (px-uv.x)*(px-uv.x) + (py-uv.y)*(py-uv.y);

// get the index based on the horizontal minimum mn;
    float mn = min(min(dp.x, dp.y), min(dp.z, dp.w));
    float i = (mn==dp.y)?idx.y:
              ((mn==dp.z)?idx.z:((mn==dp.w)?idx.w:idx.x));

// access the 2d image texture as 1d array
    vec2 coord = floor(vec2(mod(i, L.y), i/L.y))/L.y;
    gl_FragColor = texture2D(r1data, coord);
}
```

FIG. 7

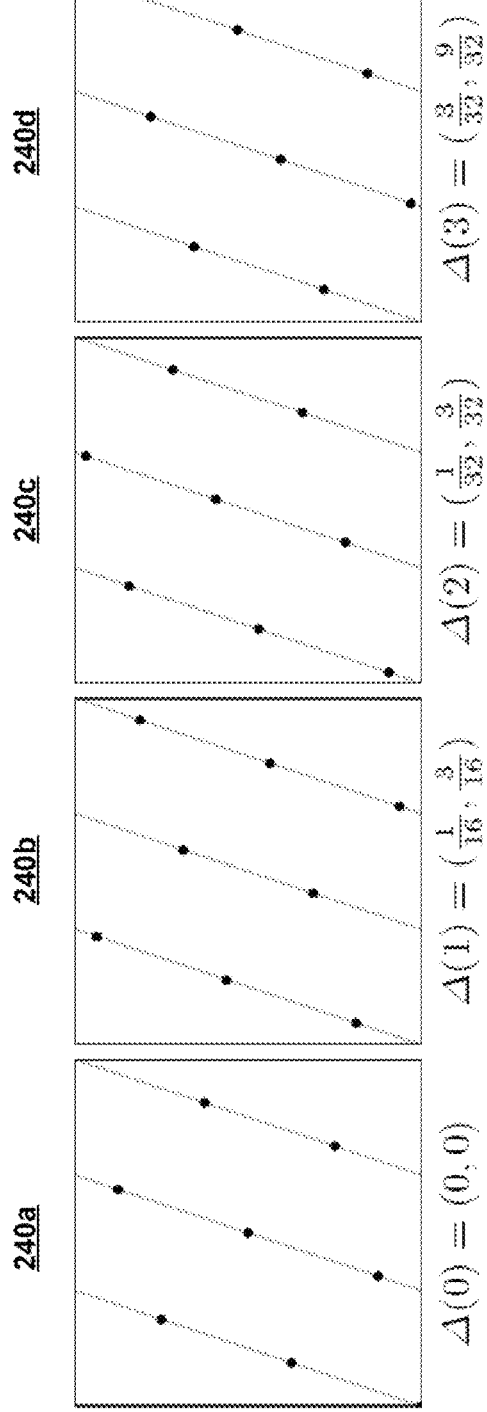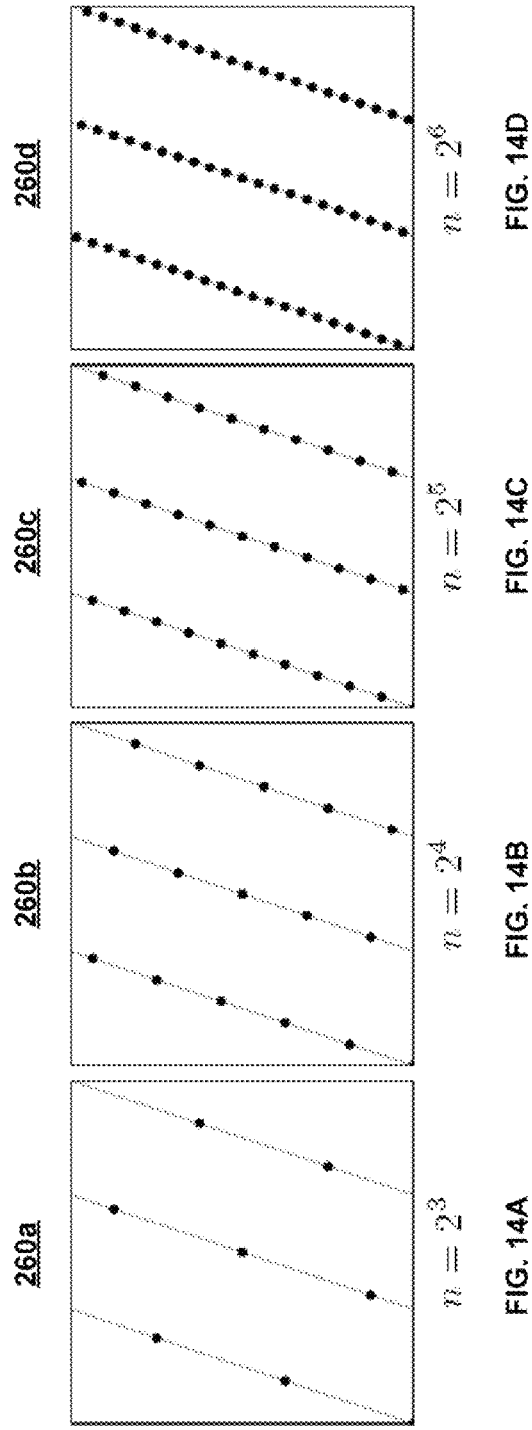

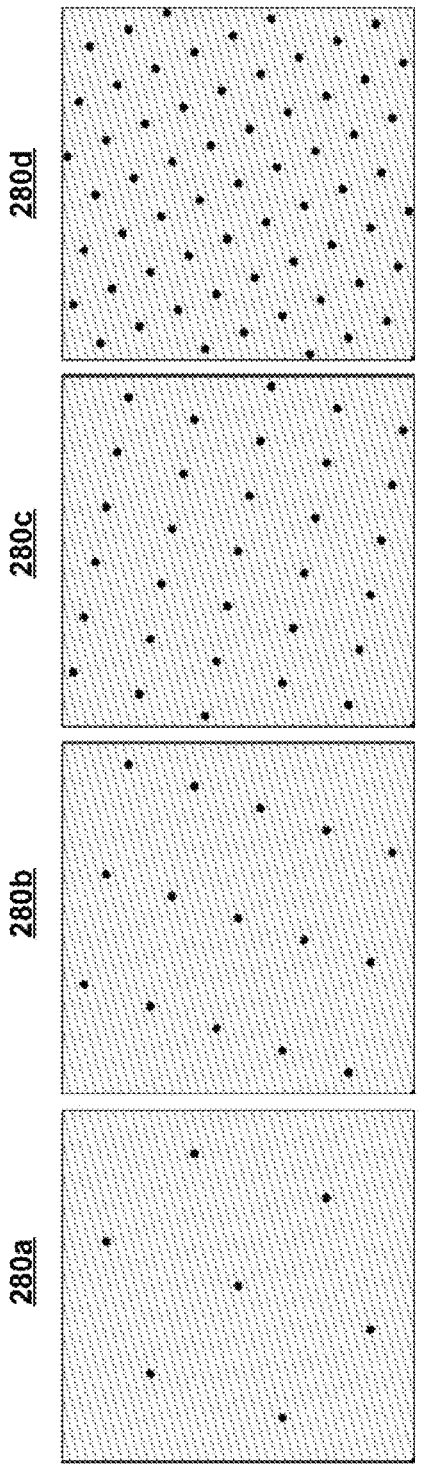
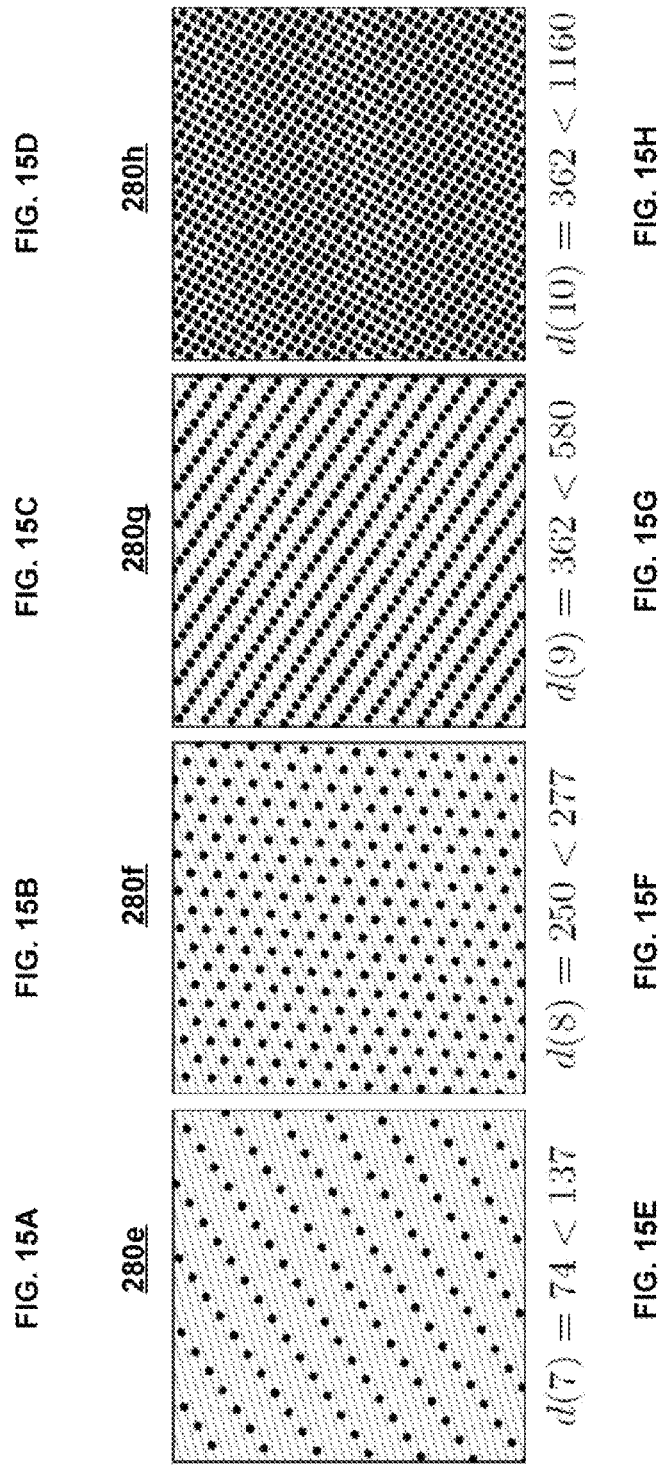
FIG. 15A  FIG. 15B  FIG. 15C  FIG. 15D
FIG. 15E  FIG. 15F  FIG. 15G  FIG. 15H

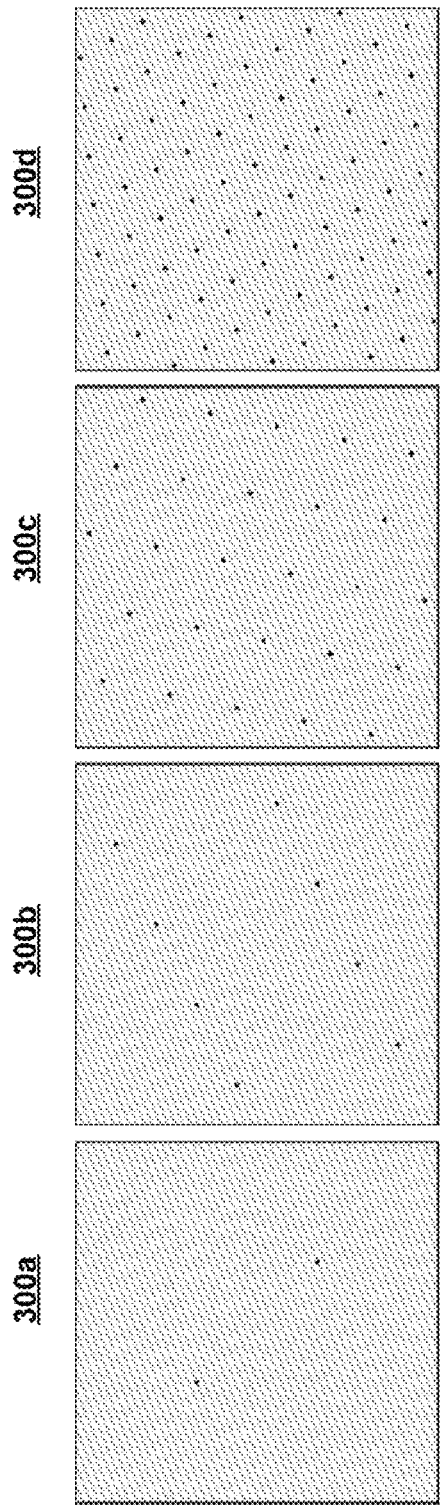
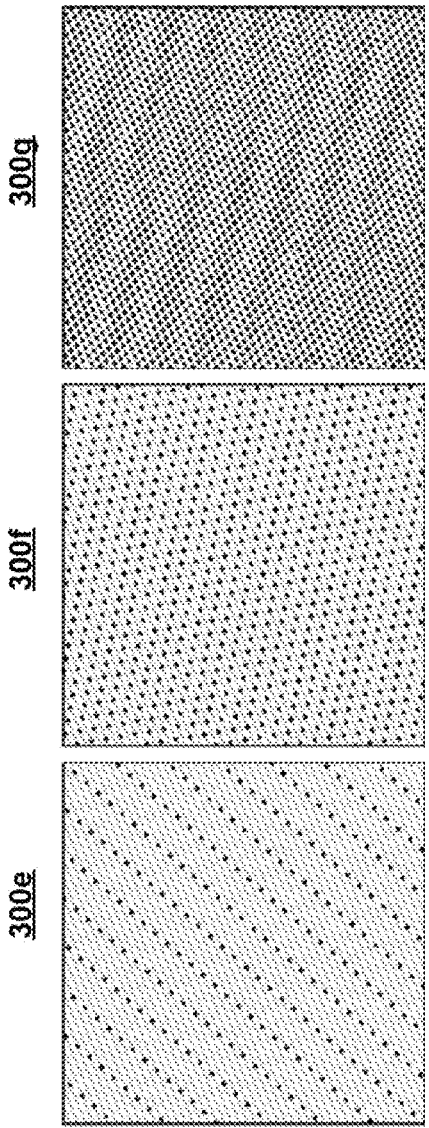
300a  
$d(1) = 2 = 2$  
FIG. 16A
300b  
$d(2) = 5 < 9$  
FIG. 16B
300c  
$d(3) = 26 = 26$  
FIG. 16C
300d  
$d(4) = 65 < 85$  
FIG. 16D
300e  
$d(5) = 113 < 261$  
FIG. 16E
300f  
$d(6) = 701 < 810$  
FIG. 16F
300g  
$d(7) = 2117 < 2522$  
FIG. 16G

320

| m | d(m) first approach | d(m) second approach |
|---|---|---|
| 2 | 9 | 5 |
| 3 | 25 | 26 |
| 4 | 34 | 65 |
| 5 | 229 | 113 |
| 6 | 745 | 701 |
| 7 | 1033 | 2117 |
| $\Sigma$ | 2075 | 3027 |

FIG. 17

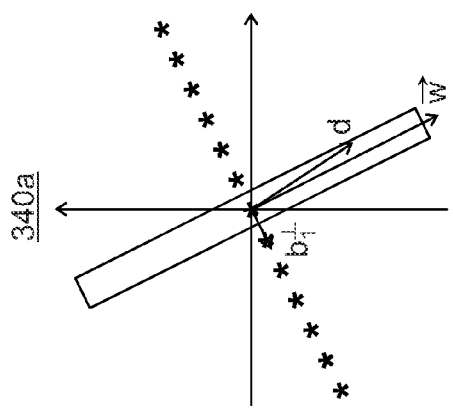
FIG. 18A  $w_L = 0.1, g = (27,2)$
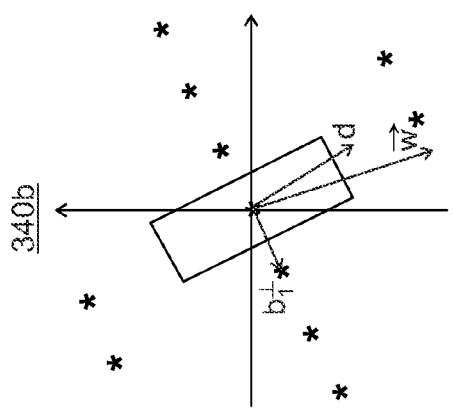
FIG. 18B  $w_L = 0.3, g = (13,2)$
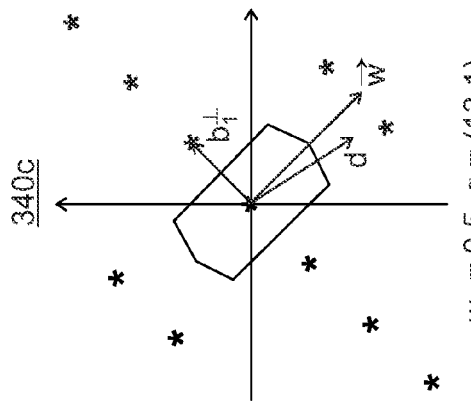
FIG. 18C  $w_L = 0.5, g = (13,1)$
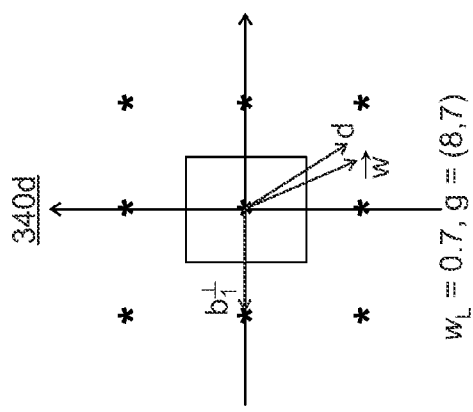
FIG. 18D  $w_L = 0.7, g = (8,7)$
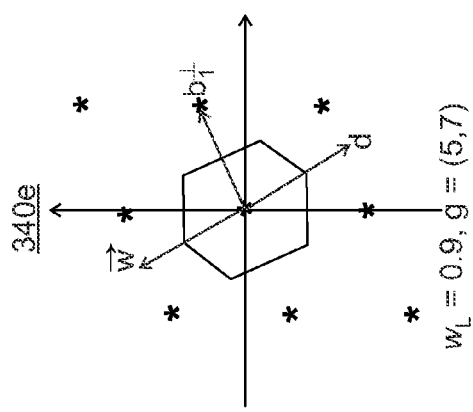
FIG. 18E  $w_L = 0.9, g = (5,7)$
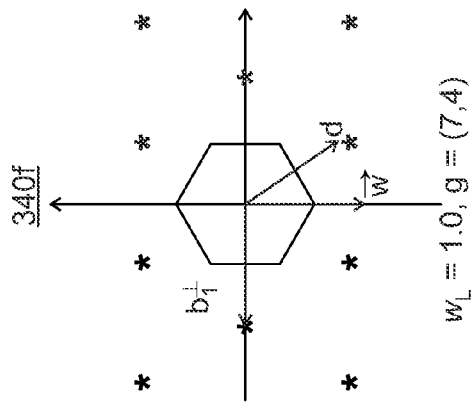
FIG. 18F  $w_L = 1.0, g = (7,4)$ 360a
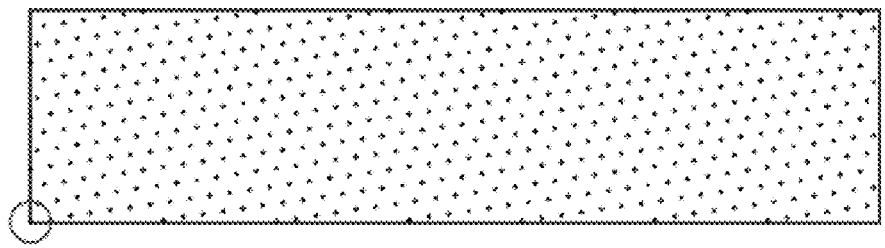
360b
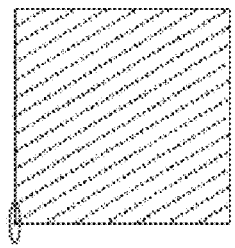
FIG. 19A  FIG. 19B
380a
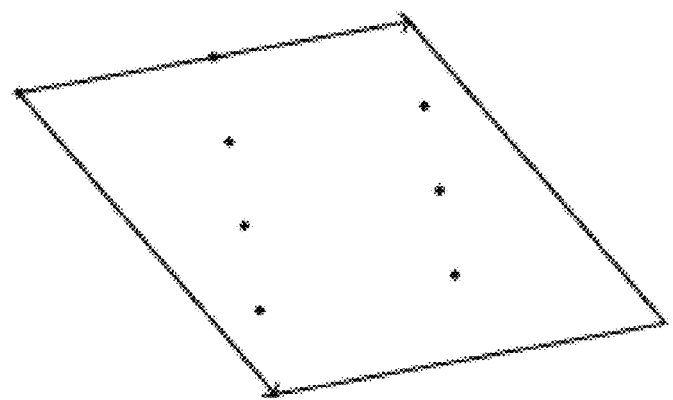
FIG. 20

LOW-DIMENSIONAL RANK-1 LATTICES IN COMPUTER IMAGE SYNTHESIS

CROSS REFERENCE TO RELATED APPLICATIONS

This application for patent claims the priority benefit of U.S. Provisional Patent Application Ser. No. 61/042,135, filed on Apr. 3, 2008 and U.S. Provisional Patent Application Ser. No. 61/078,351, filed on Jul. 4, 2008 each of which is incorporated by reference herein in its entirety.

In addition, this application for patent is a continuation-in-part of U.S. patent application Ser. No. 11/474,091, filed on Jun. 23, 2006 which claims the priority benefit of U.S. Provisional Patent Application Ser. No. 60/693,232, filed on Jun. 23, 2005 and which is a continuation-in-part of U.S. patent application Ser. No. 10/439,311, filed on May 15, 2003 which claims the priority benefit of U.S. Provisional Patent Application Ser. No. 60/378,115, filed on May 15, 2002 each of which is incorporated by reference herein its entirety.

FIELD OF THE INVENTION

The present invention relates to systems, methods, devices, architectures, apparatus and computer software/program code products for computer graphics. More particularly, the present invention relates to methods, computer-based structures, and computer program code products operable to search for rank-1 lattices and rank-1 lattice sequences in image synthesis. Applications of the invention include, but are not limited to, image representation, synthesis of textures, approximation of spectra, and anti-aliasing.

BACKGROUND OF THE INVENTION

The use of synthetic images has become increasingly important and widespread in motion pictures and other commercial and scientific applications. A synthetic image typically represents a two-dimensional array of digital values, called picture elements or pixels, and thus is commonly regarded as a two-dimensional function.

Image synthesis is the process of creating synthetic images from scenes. As a general matter, digital images are generated by rasterization or, in the case of photorealistic images of three-dimensional scenes, by ray tracing. Both approaches aim at determining the appropriate color for each pixel by projecting the original function into the pixel basis. The discrete representation of the original function creates a number of problems, including aliasing.

In particular, computing the intensity of a single pixel requires an integration of a function over the pixel area. This integral is often highly complex and cannot be solved analytically, thus requiring numerical methods for solution, which may include Monte Carlo and quasi-Monte Carlo methods. However, typical numerical methods used in such applications have their own limitations and attendant problems.

Another computational approach used in computer graphics is lattice theory. For example, the accumulation buffer typically used in computer graphics exploits the structure of regular grids. In addition, efficient rasterization techniques have been designed by taking advantage of such grids. Certain sampling techniques employ Fibonacci lattices, which are a type of rank-1 lattice.

It would be desirable to provide methods, systems, devices, and computer software using rank-1 lattices that can be generated rapidly and efficiently, and that are readily adapted to the requirements of image synthesis and other computer graphics applications.

It would also be desirable to provide such methods, systems, devices and software that enable the efficient application of rank-1 lattices to anti-aliasing, rasterization, and other computer graphics functions.

Image synthesis by use of rank-1 lattices is discussed in commonly owned U.S. application Ser. No. 11/474,091 and PCT Application Serial No. PCT/US06/024820, both filed Jun. 23, 2006, and entitled "Image Synthesis by Rank-1 Lattices" each of which is incorporated herein by reference as if set forth in its entirety.

The algorithmic benefits of rank-1 lattices selected by maximized minimum distance (MMD) were discussed in the noted patent applications in the context of image synthesis. Compared to classical tensor product lattices, their geometry allows for a higher sampling efficiency resulting in a better image quality at same storage cost. Therefore, rank-1 lattice images are a potentially advantageous alternative to the traditional square pixel layout.

However, finding the best MMD rank-1 lattice for a given unit square and number of lattice points n can be computationally expensive. In certain cases, the best MMD rank-1 lattice can be determined by a formula. However, in other cases, the best MMD rank-1 lattice can only be found through an exhaustive search.

There is thus a need for systems and techniques for conducting an efficient search for the best MMD rank-1 lattice, or a reasonably close approximation thereof.

SUMMARY OF THE INVENTION

The invention provides systems, devices, methods and computer program code (software) products for, among other aspects and possible applications, enabling computer graphics systems to accurately and efficiently render images. Systems, devices, methods and computer program code (software) products in accordance with the invention are suitable for implementation or execution in, or in conjunction with, a computer graphics system including a computer for rendering images for storage or for display, such as on a display element, wherein the rendering of an image includes utilizing the computer and/or other elements of the computer graphics system to generate pixel values corresponding to pixels in an image representation. Systems, devices, methods and computer program code (software) products in accordance with the present invention are suitable for implementation or execution in, or in conjunction with, a wide range of commercially available computer graphics systems or software environments, such as those available from NVIDIA CORPORATION of Santa Clara, Calif.

One aspect of the present invention relates to methods, systems and computer program code (software) products executable in a digital processor operable to generate a synthetic image, wherein the methods, systems and computer program code (software) products include (1) selecting a rank-1 lattice in accordance with a maximized minimum distance function (max-min-dist lattice); (2) generating a data structure for efficient access of data stored in points of the rank-1 lattice, the data structure including the number n of lattice points, generator vector g, s basis vectors, and indices of the basis vectors, wherein tie basis vectors are lattice points, and (3) generating, using the rank-1 lattice, digital output representative of a synthetic image, wherein the generating includes using the layout of rank-1 lattice points to represent textures in arbitrary dimension.

Another aspect of the invention includes selecting a rank-1 lattice by maximizing mutual minimum distance of lattice points.

A further aspect of the invention includes accessing lattice points in any of a general rank-1 lattice or a lattice in Korobov form. In accordance with one practice or embodiment of the invention, accessing lattice points of a lattice in Korobov form can include accessing lattice points of a lattice in Korobov form in higher dimension.

Another aspect of the invention can include executing interpolation on at least one rank-1 lattice.

Still another aspect of the invention includes providing any of texture access, tiled multi-resolution textures using rank-1 lattice, or texture synthesis utilizing Fourier transform.

A further aspect of the invention includes providing image processing utilizing the rank-1 lattice structure, wherein the image processing includes edge detection.

In another aspect of the invention, generating output representative of the image includes utilizing least-squares resampling.

Yet a further aspect of the invention includes representing higher dimensional data with higher dimensional rank-1 lattices, wherein representing higher dimensional data includes utilizing volumetric textures in 3 dimensions.

The invention can also include searching for generator vectors of rank-1 lattices that approximate a given spectrum, wherein the searching for generator vectors can include utilizing rasterization and/or weighted norms.

In accordance with another aspect of the invention, the rank-1 lattice is utilized to represent n-dimensional data.

In another aspect of the invention, numerical integration is executed utilizing spectrum-selected rank-1 lattices to enable anti-aliasing, for example.

Another aspect of the invention includes utilizing the digital output representative of a synthetic image to implement a rank-1 lattice-based display device.

These and other aspects, examples, embodiments and practices of the invention, whether in the form of methods, devices, systems or computer software code products (software), will be discussed in greater detail below in the following Detailed Description of the Invention and in connection with the attached drawing figures.

BRIEF DESCRIPTION OF THE DRAWINGS

FIG. 7 is an exemplary listing of a GLSL implementation of nearest neighbor texture lookup with periodic boundary conditions for Korobov lattices.

FIGS. 13A-D, 14A-D, and 15A-H are a series of graphs illustrating lattice sequences based on an initial MMD rank-1 lattice.

FIGS. 16A-G are a series of graphs illustrating an approximate search by restricting the search space.

FIG. 17 is a table comparing the minimum distances for the first $b^m$ points of the lattice sequences resulting from search techniques according to aspects of the invention.

FIGS. 18A-F are a series of graphs illustrating a search of anisotropic rank-1 lattices to approximate spectra according to a further aspect of the invention.

FIGS. 19A-B show a pair of rectangles illustrating searching on a rectangular domain.

FIGS. 20 and 21 are a pair of diagrams illustrating the search of searching a rank-1 lattice according to the spectrum (1, 0) by a weighted norm.

DETAILED DESCRIPTION OF THE INVENTION

The present application for patent presents a framework for image, texture, and spectrally adaptive methods including a number of interpolation schemes on rank-1 lattices, described in the context of tiled resolution sets. For that purpose, there is introduced an efficient addressing scheme on rank-1 lattices and a construction for a family of uniform, bivariate B-splines designed to match the geometrical structure of rank-1 lattices.

1. Introduction

Displays and images are typically characterized by square pixels. However, hexagonal sampling grids have been investigated for more than 40 years, as an alternative to the conventional square grid, giving rise to the field of hexagonal image processing (HIP). With applications in numerous areas, hexagonal image processing is an active field in computer vision. Previous work in this area has suggested the possibility of hexagonal image processing based on hierarchical aggregates. Both square pixels and hexagonal pixels, called "hexels," have the property of tiling the plane. Thus, both hexagonally-sampled and square-sampled images can be viewed as a periodic monohedral tiling. Each tile represents a picture element, and is a Voronoi cell of the respective sampling point contained within that tile.

Figure 1:
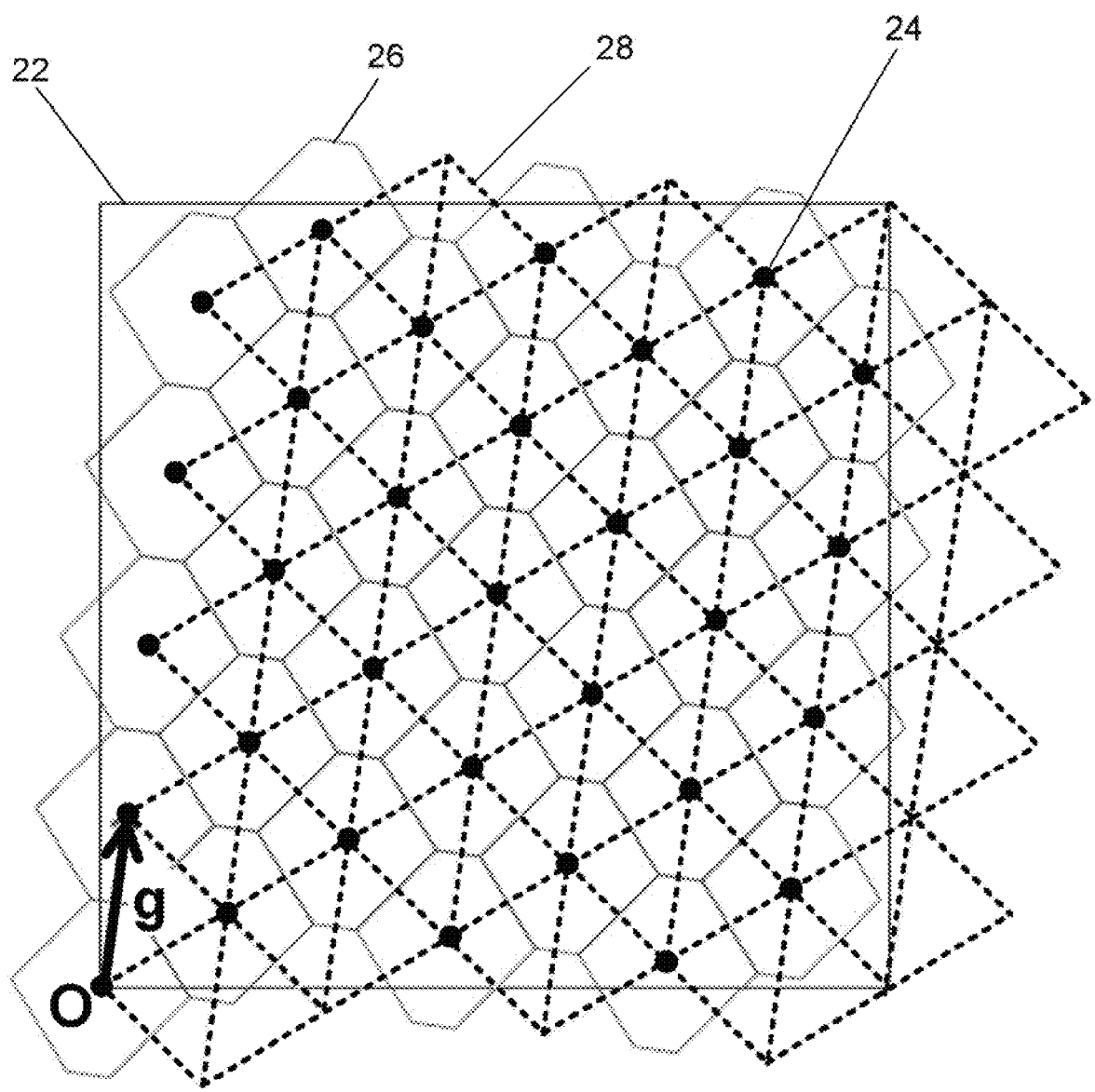
FIG. 1 is a diagram of a lattice scheme for an exemplary unit square, illustrating the geometry of rank-1 lattices.

FIG. 1 is a diagram of a lattice scheme 20 for an exemplary unit square 22 that illustrates the geometry of rank-1 lattices for n=32 (points 24) and the generator vector $$g = \begin{pmatrix} 1 \\ 7 \end{pmatrix}.$$

The "honeycomb" of tiled hexagons 26 depicts the Voronoi diagram. Each individual hexagon is a Voronoi cell generated by a respect lattice point. Each Voronoi cell contains the points of the unit torus that are closer to a given lattice point than to any other. In addition, each lattice point is the centroid of its respective Voronoi cell. The dotted lines 28 represent the dual graph, i.e., the Delaunay tessellation, which can be generated by dividing the fundamental parallelepiped along its shorter diagonal.

As illustrated in FIG. 1, similar to hexagonal displays and images, a rank-1 lattice (points 22) tiles the plane by its Delaunay triangulation (dotted lines 24) and Voronoi diagram (hexagons 26). This leads to the approach of structuring the pixels of an image as Voronoi cells of a rank-1 lattice. Such pixels are hereinafter referred to as "r1-pixels." Rank-1 lattice images are hereinafter referred to as "r1-images."

In contrast with hexagonal lattices, rank-1 lattices perfectly tile the unit square I=[0,1)² periodically for any number n of points, offering more flexibility with respect to the shape of the image domain. As described in further detail below, aspects of the present invention are directed to advantageous implementations that employ maximized minimum distance (MMD) rank-1 lattice displays and images. Since rank-1 lattices are available for any number n of points, the number of pixels can be chosen freely.

FIGS. 2A-2D are a series of diagrams illustrating the transition from a regular to a hexagonal grid using a sequence of Korobov lattices $L_{144,n}$ 40b-c, in which the minimum distance increases from left to right. FIG. 2A shows a rectangular lattice 40a, and FIG. 2D shows a hexagonal lattice 40d. Thus, as illustrated in FIGS. 2A-2D, maximizing minimum distance in a lattice results in a grid that, at its limit, approaches a hexagonal grid 40d, thereby yielding approximately hexagonal picture elements. Thus, rank-1 lattices benefit from the strengths of a hexagonal lattice, compared with a traditional square lattice, including: a higher sampling efficiency; an improved angular resolution, as there are more nearest neighbors; and improved optical results. For example, it is possible to achieve a smoother representation of curved objects.

At the same time, image processing algorithms are simplified in comparison to algorithms used to process hexagonal lattices. For example, image processing algorithms which are based upon the fast Fourier transform (FFT) become simpler and can be implemented in a more efficient way.

Hexagonal lattices have been used in a number of different contexts, e.g., to derive a storage scheme for interleaved framebuffers and textures to provide a region layout in summed area tables, and in the context of digital halftoning. However, it is believed that, to date, hexagonal lattices have not been commonly used in computer graphics.

2. Rank-1 Lattices

A lattice L is a discrete subset of $\mathbb{R}^s$ which is closed under addition and subtraction. Given an s-dimensional lattice basis $\{b_1, \ldots, b_s\}$, the lattice can be generated by all integer linear combinations $$L(b_1 \ldots b_s) := \left\{ \sum_{j=1}^{s} \lambda_j b_j : \lambda_1, \ldots, \lambda_s \in \mathbb{Z} \right\}. \quad (1)$$

Figure 3:
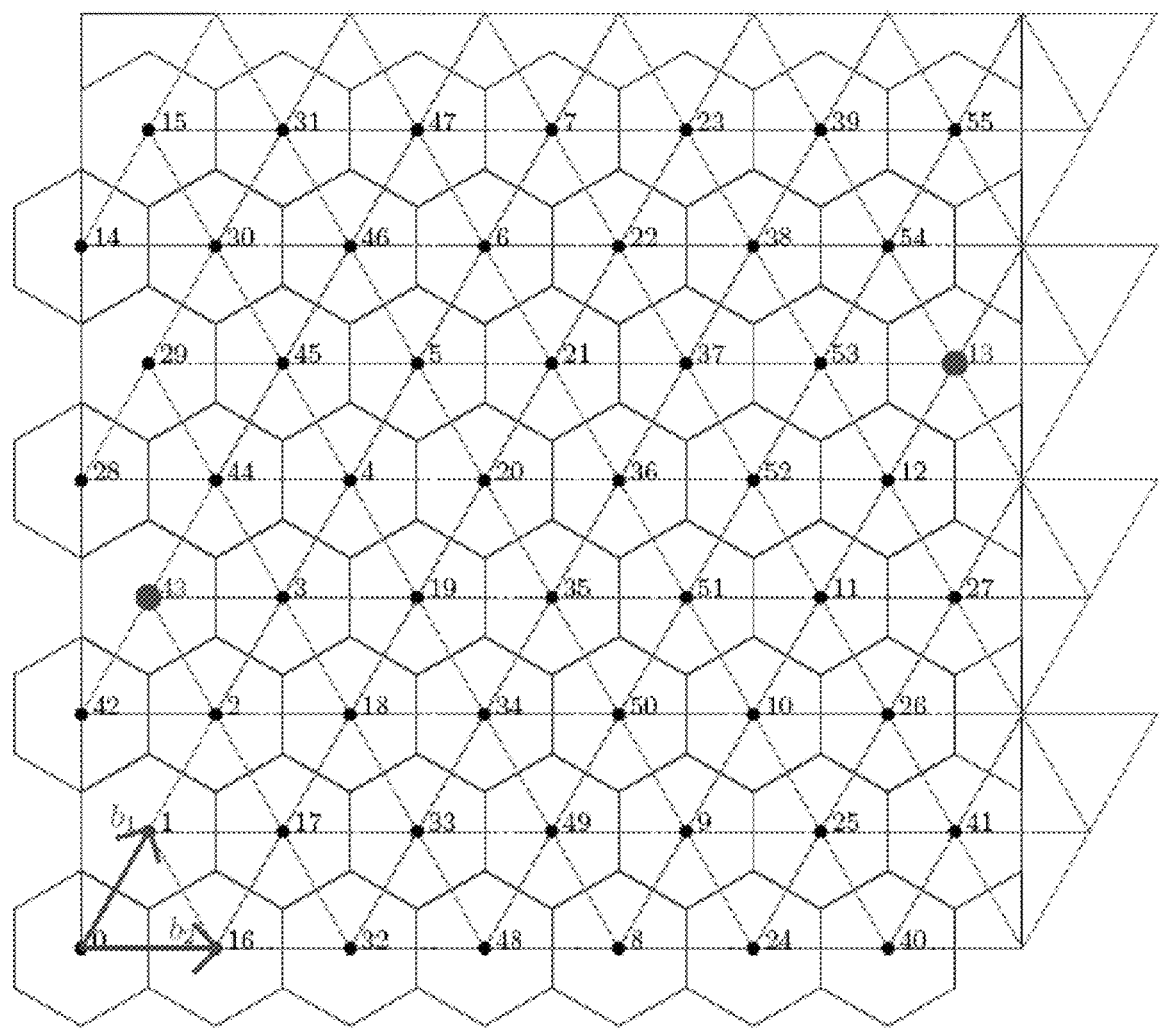
FIG. 3 shows a diagram of an exemplary unit square illustrating the computation of the index of an arbitrary lattice point.

Of all possible bases the Minkowski-reduced bases, which contain the s shortest linearly independent vectors of L, are the most useful for the present purposes. Such bases contain the s shortest linearly independent vectors. FIG. 3 shows a diagram of an exemplary unit square 60 illustrating the computation of the index of an arbitrary lattice point for the lattice $L_{56(4,7)}$ with $\text{index}_{b_1}=1$ and $\text{index}_{b_2}=16$. As shown in FIG. 3, these vectors actually describe the Delaunay tessellation and are span the fundamental parallelepiped, which corresponds to the parallelepiped, or Delaunay cell, anchored at the origin.

Instead of using s basis vectors, the points $x_i$ of a rank-1 lattice $$L_{n,g} := \left\{ x_i := \left(\frac{i}{n}g\right)_1 : i = 0 \ldots, n-1 \right\} \quad (2)$$

in the unit cube are easily generated by using only one suitable generator vector $g \in \mathbb{N}^s$ for a fixed number $n \in \mathbb{N}$ of points, where $\{x\}_1$ denotes the fractional part of a vector x, i.e., $\{x\}_1 = x \mod 1$. Likewise let $\{x\}_n = x \mod n$. Korobov lattices $L_{n,a}$ are a special class of rank-1 lattices. Their generator vector has the form $g=(1, a, a^2, \ldots, a^{s-1})$.

2.1 Maximized Minimum Distance Rank-1 Lattices

In computer graphics sampling patterns with blue noise spectral properties are used analogously to the principle of maximized minimum distance apparent in nature. For example the photo receptors in the retina are distributed according to this scheme in order to reduce aliasing. Similarly, rank-1 lattice generator vectors can be selected to maximize the minimum distance, which leads to the notion of maximized minimum distance (MMD) lattices. The task of calculating the minimum distance in a lattice is a well known problem in lattice theory, namely the shortest vector problem. Since the set of points in a lattice is closed under addition and subtraction, the difference between two lattice points yields another point in the lattice. Therefore, in a given lattice, the minimum distance corresponds to the length of the shortest vector in the lattice. This quantity can be computed by searching the closest point to the origin, considering all lattice points except $x_o=0$.

Figure 2:
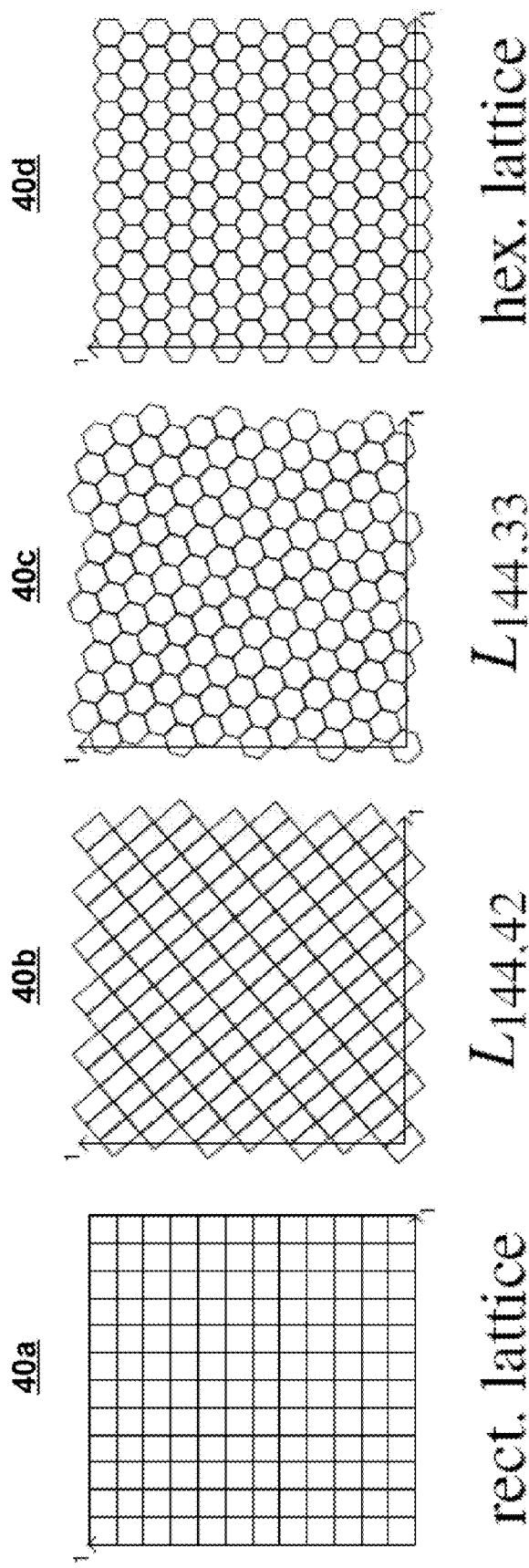
FIGS. 2A-2D are a series of diagrams illustrating the transition from a regular grid to a hexagonal grid using exemplary rank-1 lattices.

For s=2 the sequence of rank-1 lattices with increasing minimum distance approximates, at its limit, a hexagonal lattice, which is illustrated in FIG. 2 for n=144 points.

As a direct construction scheme for MMD lattices is only known for $n=2F_m M_m$ points with $$\left\{ \frac{F_m}{M_m} \right\}_{m=1}^{\infty} = \frac{2}{1}, \frac{5}{3}, \frac{7}{4}, \frac{19}{11}, \ldots$$

being the sequence of convergents of the continued fraction equal to $\sqrt{3}$, the generator vector has to be determined by a computer search for other n. Using the fact that the hexagonal lattice achieves the largest minimum distance in two dimensions, a fast search strategy is possible by applying a rasterization algorithm, described below. In this manner a complexity of $O(\sqrt{n}\log(n))$ can be achieved.

2.2 Addressing on Rank-1 Lattices

Related to the generation of rank-1 lattice images and textures is the problem of storing and addressing individual lattice points. Contrary to the square lattice, r1-pixels cannot easily be addressed by 2-dimensional integer Cartesian coordinates, since the points of a rank-1 lattice are not aligned in two orthogonal directions. An alternative choice for the coordinate axes would be the axes induced by the basis vectors of the lattice, yielding integer coordinates as well. However, this does not result in a straightforward addressing scheme. In the following, there is described an efficient addressing approach, in which r1-pixels are accessed by only one integer coordinate.

2.2.1 Memory Layout

Exploiting the property that every point $x_i$ in a rank-1 lattice can be generated by a single generator vector g allows for a very simple and efficient addressing scheme. As $$x_i = \frac{i}{n} \cdot g$$

is uniquely defined by i, this index can be used to address the corresponding r1-pixel in the image. This approach allows a rank-1 lattice image to be stored as a linear array img of size n. Thus the value at r1-pixel i is stored at position img[i]. Conversely, the value for the i-th r1-pixel can be accessed by the index i.

In the case of Korobov lattices the index i can be retrieved given the integer coordinates $$(x_1, x_2) = \{i \cdot g\}_n = \{i \cdot (1,a)\}_n = \{(i, a \cdot i)\}_n$$

of a lattice point. The first component of $X_i \in [0,n)^2$ inherently corresponds to the point index. For general rank-1 lattices, the x-coordinate of a lattice point may not be uniquely determined anymore. Therefore, the index of an arbitrary lattice point $x_1 \in [0,n)^2$ is computed via the indices of the basis vectors of $L_{n,g}$, which is explained in the next section.

2.2.2 Addressing Scheme

Let $B=(b_1, b_2)$ be a Minkowski-reduced basis of the lattice $L_{n,g}$. Such a basis can be found by a search over all n points $x_i$ using their shortest distance to the origin on the unit torus. Additionally the indices of both the shortest and second-shortest vectors are stored during the search, yielding the indices k=index$_{b1}$ and l=index$_{b2}$ of $b_1$ and $b_2$. Then due to the periodicity of the lattice, the following holds for the basis vectors for $j \in \{1,2\}$:

$$b_{1,j} = \min\left\{\left\{\frac{k}{n} \cdot g_j\right\}_1, 1 - \left\{\frac{k}{n} \cdot g_j\right\}_1\right\}$$

$$b_{2,j} = \min\left\{\left\{\frac{l}{n} \cdot g_j\right\}_1, 1 - \left\{\frac{l}{n} \cdot g_j\right\}_1\right\}$$

In contrast with the basis vectors of a hexagonal lattice, which are uniquely defined, the basis layout may differ for each rank-1 lattice with respect to orientation and angle between the vectors. In order to avoid a distinction of cases for neighborhood computations, a lattice basis must obey the convention that the angle between b1 and b2 is less than 90°. This condition is met by setting $$(b_1, b_2) = \begin{cases} (b_1, b_1 + b_2) & \text{if } (b_{1x} \cdot b_{2x} + b_{1y} \cdot b_{2y}) < 0 \\ (b_1, b_2) & \text{else} \end{cases}$$

Given any lattice point $x_i = (x_{i,1}, x_{i,2}) \in [0,1)^2$, a first step in computing its point index i includes transforming $x_i$ into the lattice basis, i.e., its coordinates $x(s,i)_B$ in the lattice basis have to be computed. Then $x_i$ can be expressed as $$(x_{i,1}, x_{i,2}) = s \cdot b_1 + t \cdot b_2.$$

Since this relationship also applies to the indices of the corresponding points, for the index i we have $$i = \{s \cdot k + t \cdot l\}_n$$

Hence, according to Korobov lattices, it is possible to store general rank-1 lattices as a linear array, using an additional basis transformation along with 2 multiplications and one addition.

FIG. 3 illustrates the presently described addressing scheme, with respect to exemplary unit square 60, for the lattice $L_{56(4,7)}$ and k=1, l=16. For example consider the lattice point $$x = (4, 21) = 3 \cdot b_1 + (-1) \cdot b_2.$$

Therefore, $$i = \{3 \cdot 1 + (-1) \cdot 16\}_{56} = \{-13\}_{56} = 43.$$

Similarly, for the point x=(52, 35), we have $x = 5 \cdot b_1 + 4 \cdot b_2$, yielding $$i = \{5 \cdot 1 + 4 \cdot 16\}_{56} = \{69\}_{56} = 13.$$

$x_{43}$ and $x_{13}$ are highlighted in FIG. 3.

2.2.3 Arithmetic Operations

The two main arithmetic operations necessary for address computations in texture and image processing are addition and subtraction modulo n. Index calculations can be performed in the same manner as for determining the index of a lattice point as described above. For example, the index i of the lattice point $x_i$ resulting from summing the position vectors of two points $x_{j1}$ and $x_{j2}$ is simply $i = \{j_1 + j_2\}_n$. Adding $x_1 = (4,7)$ and $x_{16} = (8,0)$ in FIG. 3 results in the vector $$x_{\{1+16\}_{56}} = x_{17} = (\{4+8\}_{56}, \{7+0\}_{56}) = (12,7).$$

Subtraction works in the same way. Generally, let $i_o$ be index of $x \in [0,1)^2$ and let $x(s,t)_B$ denote its representation in lattice coordinates. Then the index of the vector $x(s+\lambda, t+\gamma)_B = (s+\lambda) \cdot b_1 + (t+\gamma) \cdot b_2$ is $$i = \{i_o + \lambda \cdot k + \gamma \cdot l\}_n.$$

3. Rank-1 Lattice Images and Textures

Similar to hexagonally sampled images, there are two basic approaches for acquiring r1-images. The first approach is to use specialized hardware for image acquisition, but up to now there exists no r1-lattice hardware, such as displays or acquisition devices. The second approach is to perform a software conversion of images that have been acquired using conventional techniques. Converting an image represented in one lattice to another lattice representation is termed "resampling." The typical procedure is to first reconstruct a continuous image from the original samples by using an interpolation function. This reconstructed image is then resampled with the new lattice. In one implementation reconstruction and resampling are combined in a single step.

One approach generates hexagonally sampled images according to this interpolation scheme and compares nearest neighbor, bilinear and bicubic interpolation. It has been concluded that a bilinear filter kernel is sufficient for the purpose of generating hexagonally sampled images when the source material has a similar resolution to the target lattice. Another approach proposes an algorithm for image resampling between orthogonal and hexagonal images with similar sampling resolutions, which is based on the least squares approach, thus minimizing loss of information by incorporating a spline transform.

3.1. Texture Generation

This section describes the software-based r1-image acquisition by resampling from a square image. At first the lattice parameters have to be determined according to the desired resampling resolution n and the width-to-height ratio w:h of the source image. If this ratio is 1:1, i.e., square resolution, the lattice and its basis are searched on the unit square. Otherwise, tile lattice and its basis are searched by means of a weighted norm.

The following parameters are stored for an r1-image:

(1) n
(2) g=($g_1$,$g_2$)
(3) b1=($b_{11}$,$b_{12}$), b2=($b_{21}$,$b_{22}$); Minkowski-reduced basis of $L_{n,g}$
(4) k,l: indices of tile basis vectors The image data is organized as a linear array of size 3·n (RGB), which is addressed by the lattice point index, discussed below. Additionally to the image data array img of size 3·n holding the accumulated color values, the resampling algorithm makes use of a count buffer of size n in order to accumulate the weights of the resampling filter.

3.1.1 Boxfilter Interpolation

The interpolation kernel needed for a visually acceptable interpolation is dependent on the resolution of tile source image. When the original data has very high resolution with respect to the resolution of the resampled image, i.e., $$xRes \cdot yRes \gg n,$$

a simple box filter is a good choice. Therefore the resampling process can be regarded as an integration of the pixels of the source image over the Voronoi cells, i.e., r1-pixels, of the rank-1 lattice. For each pixel of the source image the index of the nearest lattice point is computed. Then the pixel value is accumulated for the lattice point $x_i$ in img[i] and the number of pixels contributing to this lattice point is increased by one in the count buffer. After stepping through all pixels, for each lattice point the image buffer is divided by the count buffer. This algorithm corresponds to the "box-filter" interpolation, and is very simple to implement.

In order to compute the nearest lattice point and its index to a pixel p=($p_1$,$p_2$) its coordinates ($p_1$/xRes, $p_2$/yRes)$\in[0,1)^2$ have to be transformed into the lattice basis, yielding p(s,t)$_B$. Then ($d_1 \cdot d_2$)=$\lfloor s,t \rfloor$ is the anchor point of the Delaunay cell (in lattice coordinates) in which the pixel lies on $[0,1)^2$. The brackets around s,t indicate the integer part. The nearest lattice point to p surely is contained in the set $$M=\{(d_1,d_2) \cdot (d_1+1,d_2),(d_1 \cdot d_2+1) \cdot (d_1+1,d_2+1)\}$$

representing the vertices of the lattice cell. Hence it results as the vertex v∈M with the shortest Euclidean distance to p. Note that the distance computation has to be performed in the Cartesian coordinate system, as the Voronoi cell is distorted in the r1-lattice coordinate system. Since the lattice coordinates of v are known, its index simply can be computed according to the addressing scheme described above.

3.1.2 Interpolation by Rank-1 Lattice B-Splines

Using interpolation filters of higher orders improves the visual quality of the resampled image. However, the traditional B-spline filters cannot be applied directly, as the hexagonal structure of the Voronoi cell will be violated both for radial symmetric and tensor-product B-splines. Therefore a family of bivariate rank-1 lattice splines is constructed such that they take into account the shape of the Voronoi cells, e.g., the first order filter (degree 0) exactly yields the Voronoi cell of the rank-1 lattice, and that they have a compact support, which enlarges with increasing degree. Moreover, they are defined to be centered at the origin.

Based on (uniform) B-splines of degree k $$N_{j,k}(t) = \frac{t-j}{k} N_{j,k-1}(t) + \frac{j+k+1-t}{k} N_{j+1,k-1}(t) \quad (3)$$

$$N_{j,0} = \begin{cases} 1 & j \le t < j+1 \\ 0 & \text{otherwise,} \end{cases}$$

with support [0,j+k+1), the rank-1 lattice splines are designed by a tensor product-like approach according to the previous properties.

Figure 4:
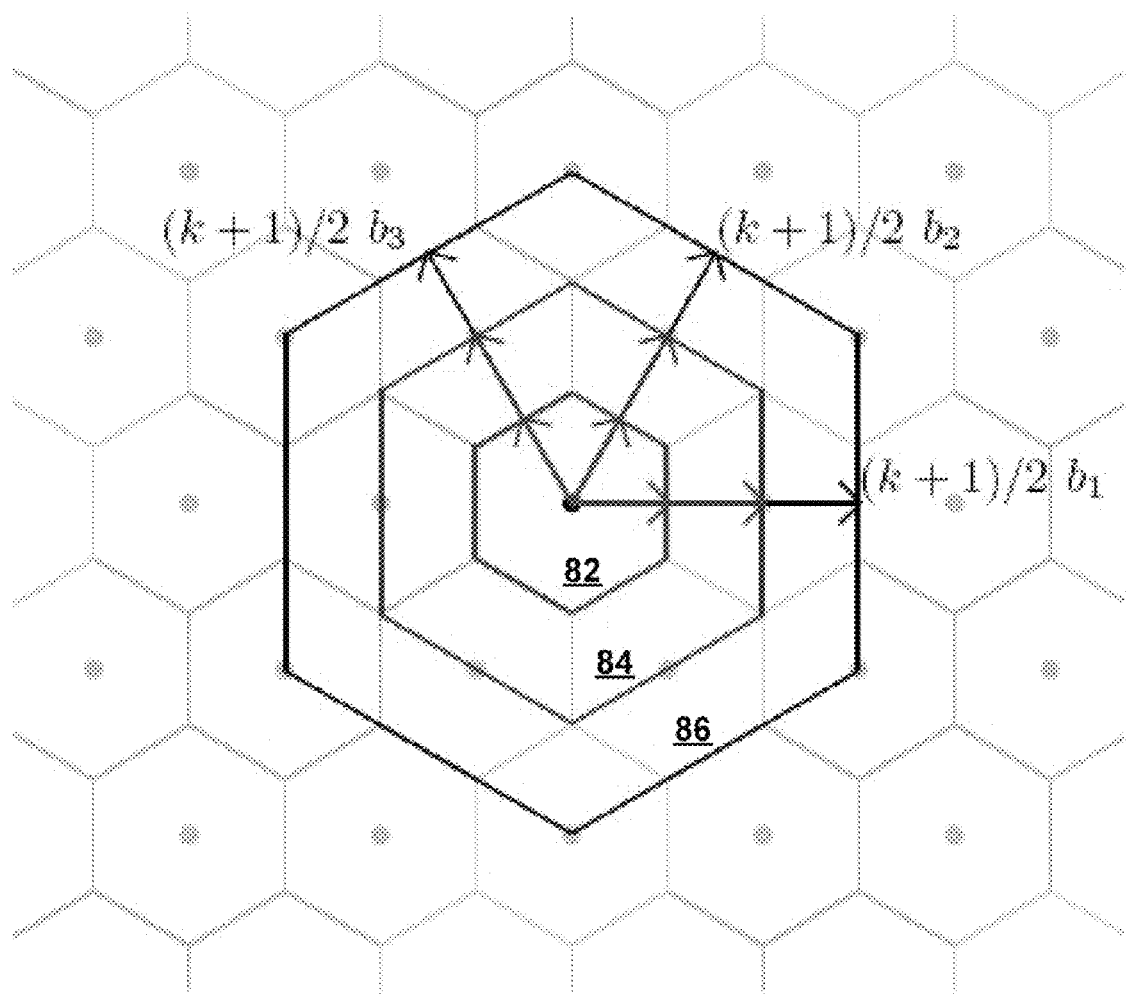
FIG. 4 is a diagram illustrating an exemplary resampling geometry for the r1-B-spline filter kernel.
Figure 5A:
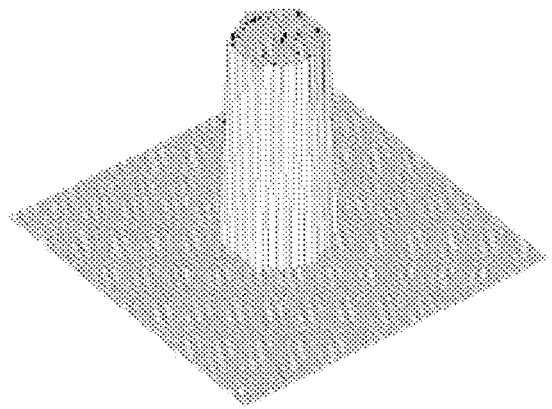
FIGS. 5A-5D are a series of diagrams showing the respective rank-1 lattice B-splines resulting from the resampling illustrated in FIG. 4.
Figure 5B:
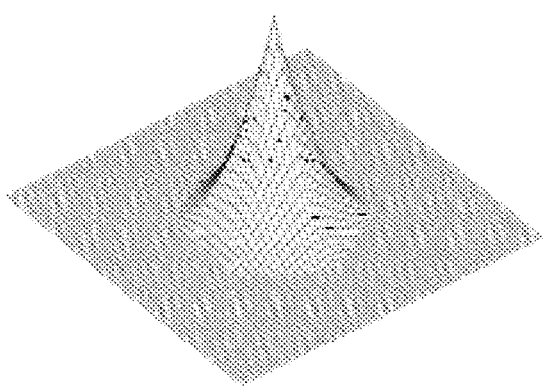
Figure 5C:
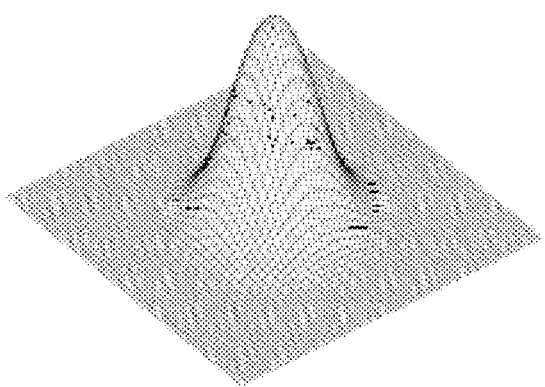
Figure 5D:
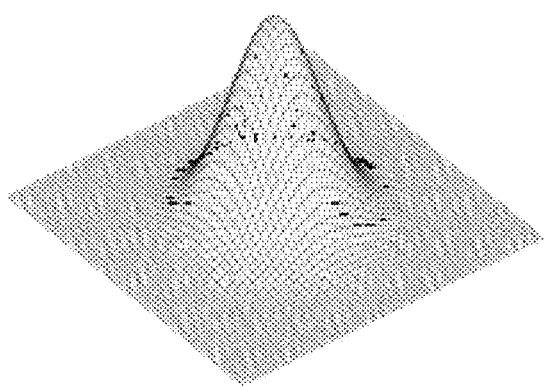

FIG. 4 is a diagram illustrating an exemplary resampling geometry 80 for the r1-B-spline filter kernel. The filter domain for k=0 is shown by the inner hexagon 82, for k=1 by the middle hexagon 84, and for k=2 by the outer hexagon 86. As illustrated in FIG. 4, the Voronoi cells in a rank-1 lattice can be described by the three vectors $$\frac{1}{2}b_1, \frac{1}{2}b_2, \text{ and } \frac{1}{2}b_3 = \frac{1}{2}(b_2 - b_1)$$

which are orthogonal to the edges of the Voronoi cell. These vectors can also be understood as their symmetry axes. Consequently let $$a_i = \frac{k+1}{2} b_i, i = 1, 2, 3, k \ge 0,$$

be the axes of the filter domain of degree k, which are displayed for different degrees k in FIG. 4 along with the associated filter domains. The three axes $$supp(a_i) = \left[-\frac{k+1}{2} b_i, \frac{k+1}{2} b_i\right), i = 1, 2, 3$$

exactly define the support of a rank-1 lattice filter. The filter weights arise from multiplying the scalar projections of a vector p onto the axes of the filter domain inserted into the uniform B-spline formula (3)

$$h_k(p) = \prod_{i=1}^{3} N_{-\frac{k+1}{2},k}\left(\frac{p \cdot \frac{a_i}{\|a_i\|}}{2 \cdot l_i}\right) \quad (4)$$

with $$l_i = \frac{1}{2}\|b_i\|.$$

Setting $$j = -\frac{k+1}{2}$$

in Equation (3) causes the B-spline to be centered at the origin. FIGS. 5A-5D show the resulting respective rank-1 lattice B-splines 100a-d on the lattice $L_{56,(4,7)}$ for k=0, 1, 2, 3.

For ease of computation all calculations of the resampling algorithm are performed on the domain of the source image I=[0,xRes)×[0,yRes), i.e., the lattice points are scaled from $[0,1)^2$ to [0,xRes)×[0,yRes), denoted by $x_i^l$. In order to compute the texture value for the i-th r1-pixel the algorithm accumulates both the weighted color values and B-spline weights of all pixels $\{p\}_k$ of the source image which contribute to the B-spline filter domain anchored at this r-pixel. Thereby, the set $\{p\}_k$ comprises all pixels within the circumcircle of the hexagonal filter domain (scaled to the source image domain). In order to determine the rank-1 lattice B-spline filter weight according to Equation (4), for each pixel $p \in \{p\}_k$ the projections $$\frac{(p - x_i^l) \cdot \frac{a_i}{\|a_i\|}}{2 \cdot l_i}, i = 1, 2, 3$$

of the vector $p-x_i^l$ onto each of the three axes of the filter domain are computed.

As a last step in the resampling process it may be necessary to assure that the energy of the resampled image equals the energy of the source image, being an important issue for image pyramids for example. This is called lifting. The presented resampling algorithms also work in anisotropic case, as for example if a square image is resampled to a rectangle r1-lattice image.

3.2 Texture Access

Since r1-images are to be used as textures in a renderer, the rank-1 lattice texture look-up remains to be specified. Texture coordinates are usually defined in the unit square, which means that the following computations can be performed on $[0,1)^2$. Given the (u, v) texture coordinate there are several possibilities to find the corresponding color in the r1-image, which rely on the geometric structure of rank-1 lattices.

3.2.1 Nearest Neighbor

The simplest texture look-up strategy uses the color of the rank-1 lattice texture cell (r1-texel) closest to the texture coordinate. This means to compute the nearest lattice point to $(u, v) \in [0,1)^2$, as described above.

3.2.2 Interpolation

Using the nearest neighbor texture look-up, the textured objects are likely to get quite a jagged appearance. For a smoother texture the following texture interpolations on surrounding r1-texels can be applied.

3.2.3 Bilinear Interpolation on Delaunay Cell

A bilinear interpolation is performed on the parallelepiped or rather Delaunay cell in which the texture coordinate lies. According to Section 3.1.1 the anchor point of the Delaunay cell (in lattice coordinates) is given by $(d_1,d_2)=\lfloor s,t \rfloor$, representing the lattice coordinates of (u, v). Hence the parallelepiped is spanned by the vertices $$\{(d_1,d_2),(d_1+1,d_2),(d_1,d_2+1),(d_1+1,d_2+1)\}$$

and the colors of the associated r1-texels are weighted with respect to distance.

3.2.4 Barycentric Interpolation on Delaunay Triangle

After the Delaunay-cell in which (u, v) lies has been determined, the r1-texel colors of both Delaunay triangles are weighted using barycentric interpolation. That way the triangle in which the texture coordinate lies is detected automatically.

Figure 6:
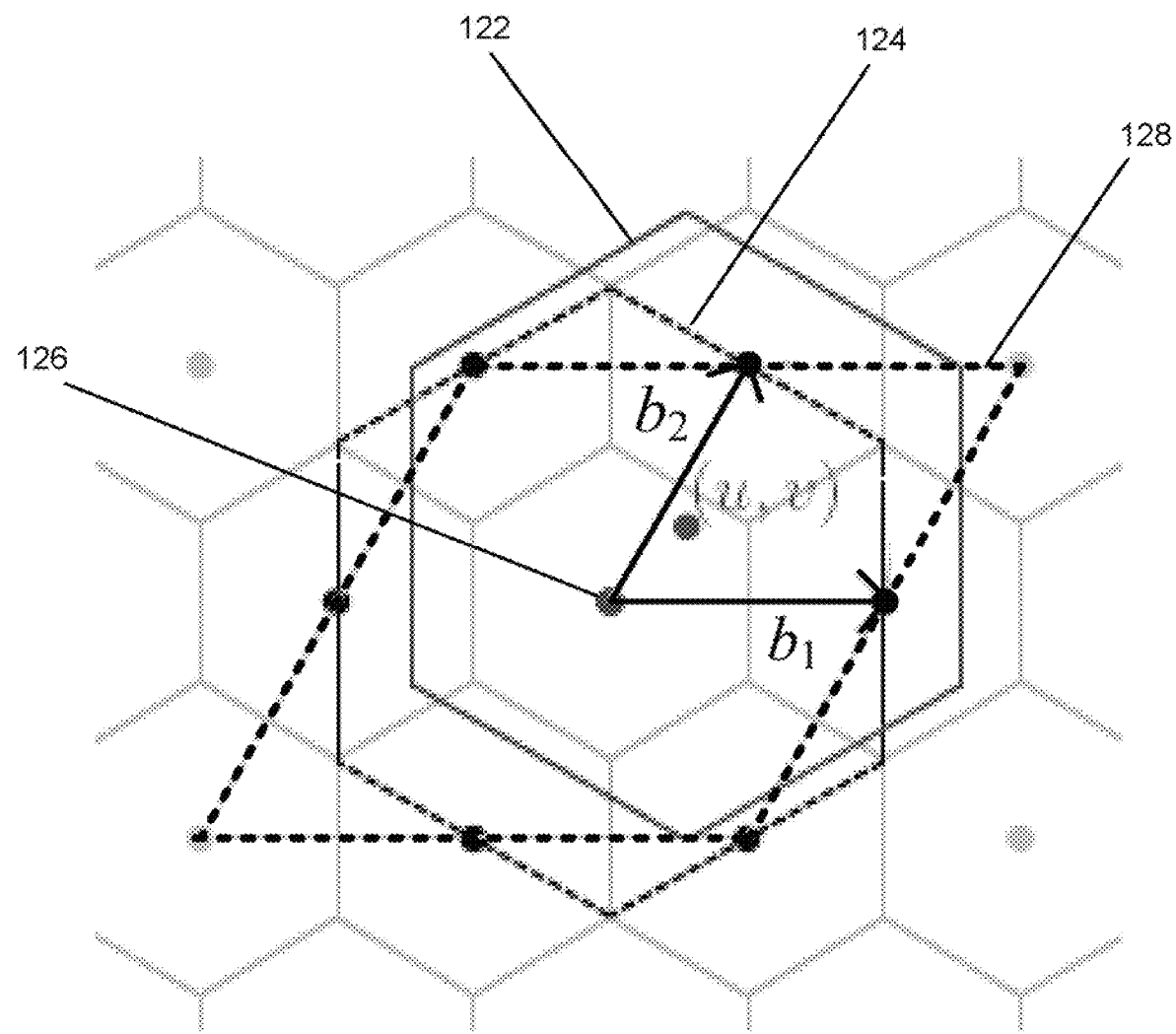
FIG. 6 is a diagram of an exemplary lattice, illustrating r1-B-spline interpolation of degree k.

3.2.5 R1-B-Spline Interpolation of Degree k:

In order to apply the family of r1-B-splines defined above for texture interpolation, an r1-B-spline of degree k is anchored in (u, v). Then the colors of the r1-texels in the filter domain are interpolated according to the resulting B-spline weights. Note that the interpolated color has to be divided by the sum of weights afterwards. The r1-texels in the B-spline support can be identified in the following way:

Compute the nearest lattice point $x_i$ to (u, v). As the set of lattice points within the filter support is a subset of the points in the support of the B-spline filter anchored at $x_i$, it suffices to list exactly those lattice points, which surely are obtained in the domain $$[-k \cdot b_1, -k \cdot b_2] \times [k \cdot b_1, k \cdot b_2]$$

and can be enumerated by a simple for-loop. This is visualized in the exemplary lattice 120 shown in FIG. 6. Hexagon 122 denotes the filter support for k=1 anchored at (u, v); hexagon 124 represents the filter support with respect to the nearest lattice point 126; parallelepiped 128 corresponds to the domain $$[-k \cdot b_1, -k \cdot b_2] \times [k \cdot b_1, k \cdot b_2].$$

Different interpolation schemes have been presented in this section. Whereas parallelepipeds become visible in the case of the bilinear interpolation, the Delaunay triangles appear in the barycentric interpolation scheme. Contrarily, the r1-B-splines take into account the Voronoi cell structure of the rank-1 lattice texture.

4. Tiled Rank-1 Lattice Resolution Sets

The "textures on demand" (TOD) approach is an earlier proposed technique designed to structure and efficiently access large amounts of stored texture data such that the I/O and CPU cost of access is minimized. The key elements of the system are texture tiles (i.e., the texture is tiled in square units adapted to fixed I/O size) and pre-filtered textures provided by means of resolution sets.

Due to their periodicity rank-1 lattices are suited very well to tiled texture layout. Tiled rank-1 lattice resolution sets (r1 r-sets) are built following earlier examples and by taking advantage of the rank-1 lattice structure. The tile size n, i.e., the number of lattice points per tile, can be chosen freely, and thus is independent of source image resolution. For example n can always be chosen as any power of 2. This is not always possible for images on square lattices, where the resolution is given as the product of the x- and y-resolution. A tiled r1-image is composed of S×T tiles, being denoted by $[S,T]_n$. Therefore image resolution corresponds to S·T·n.

The size of the r-set is determined by the number of tiles $[S_0,T_0]_n$ in the highest resolution. The resolution of the images in the r-set is set to be [S,T] where S and T are integers with $S_0 \geq S \geq 0$ and $T_0 \geq T \geq 0$. One possibility to define a complete r-set is to demand the r-set to consist of all downsampled versions of the source image, where the parameters S and T are determined by consecutive integer bisection so that there are $\lfloor \log(S_0)+1 \rfloor \times \lfloor \log(T_0)+1 \rfloor$ elements in the r-set.

If $S_0$ and $T_0$ are powers of two, the storage cost for a complete r-set can be computed using techniques known in the art, and is at most four times the storage cost of the original r1-image $[S_0, T_0]$.

4.1 Implementation Hints

The tiled r1 r-set is generated from a source image of a resolution of xRes×yRes pixels. Additionally the r-set is specified by the number n of lattice points per tile and the number of (initial) tiles $[S_0, T_0]$ in the highest resolution. In order to compute the lattice parameters $L_{n,g}$, the dimension in pixels of the initial tiles has to be determined by xRes/$S_0$× yRes/$T_0$, yielding the width-to-height ratio of the search domain. This lattice describes the image tiles and stays the same throughout r-set generation process. For each resolution [S,T] of the r-set a tiled rank-1 lattice image has to be computed with the tile dimension in pixels being equal to xRes$_{tile}^S$×yRes$_{tile}^T$=xRes/S×yRes/T. This simply can be realized by generating a rank-1 lattice image for each tile shifted over the source image using non-periodic boundary conditions so that the tiles can be put together seamlessly.

The TOD implementation based on rank-1 lattices follows earlier structures. However, there is a difference consists in the r-set member identification, which is performed in two steps. At first we determine the r-set members satisfying the width-to-height ratio of the texture region (swidth, twidth) with center (s,t) of which the renderer requests a filtered value. Among those candidates we select the one with $$\frac{1}{n \cdot S \cdot T} \geq swidth \cdot twidth$$

i.e., the resolution is chosen for which the r1-pixel area corresponds to the area of the required texture region. Given a suitable member of the r-set, the tile number, which is necessary to build the tile key, is obtained by $$\left\lfloor \frac{s \cdot xRes}{xRes_{tile}^S} \right\rfloor, \left\lfloor \frac{t \cdot yRes}{yRes_{tile}^T} \right\rfloor.$$

In order to fulfill the texture r1-pixel demand of the renderer the tile itself is indexed by a nearest neighbor rank-1 lattice texture look-up, as detailed in Section 3.2.

FIG. 7 is an exemplary listing 140 of a GLSL implementation of nearest neighbor texture lookup with periodic boundary conditions for Korobov lattices.

5. Results

The effect of resampling to both MMD rank-1 and square lattice images has been compared. A source image was given by a zone plate having a resolution of 512×512 pixels. An MMD rank-1 lattice image and a square lattice image were generated. Both generated images provided the same resolution of 4096 points. Aliasing artifacts are visible in both images. This can be explained by the fact that the new pixel layout shares the disadvantages of all current display technologies which rely on regular structures to present images. Therefore correlations between the function to be displayed and the regular pixel structure can be perceived as distorting artifacts, which cannot be completely avoided because of the correlation of a deterministic display and a deterministic function.

In a rank-1 lattice every lattice point has six neighbors (however not equidistant as in the hexagonal lattice), yielding a better angular resolution than in traditional pixel case. Thus images based on MMD rank-1 lattices allow for an enhanced representation of curved objects. This becomes apparent especially in lower resolutions. But the square lattice is superior to rank-1 lattices with respect to horizontal and vertical lines, instead. Additionally to a texture generation toolkit, rank-1 lattice textures have been integrated into a ray tracing system.

Moreover, rank-1 lattice textures are simple to implement as a shader for GPU in real-time applications. An example of a GLSL nearest neighbor texture look-up, described above, with periodic boundary conditions for Korobov lattices is given in FIG. 7. The r1-image is stored as a 2-dimensional array. The two 4-dimensional vectors L and b hold both the lattice parameters (n, sN, g, d) and its basis $$b=(b_{11}, b_{12}, b_{21}, b_{22}).$$

Thereby, n corresponds to the number of lattice points and g defines the generator vector of the Korobov lattice. The 2-dimensional texture is accessed as a one-dimensional array by the parameter $$sN = \lceil \sqrt{n} \rceil \text{ and } d = \frac{n}{b_{11} \cdot b_{22} - b_{12} \cdot b_{21}}$$

is used to transform the texture coordinate into the lattice basis in order to determine the anchor point of the Delaunay cell.

6. Maximized Minimum Distance and Spectra

Selecting rank-1 lattices with respect to maximized mutual minimum distance has been shown to be very useful for image representation and synthesis in computer graphics. While techniques using rank-1 lattices are very simple and efficient, the selection of their generator vectors often has to resort to exhaustive computer searches, which is prohibitively slow. For the two-dimensional setting, there is introduced an efficient approximate search algorithm and transfer the principle to the search for maximum minimum distance rank-1 lattice sequences. The search is then extended for rank-1 lattices to approximate a given spectrum and applications in computer graphics are presented.

6.1 Introduction

Due to their algorithmic efficiency, rank-1 lattices and rank-1 lattice sequences are interesting objects for computer graphics: The n points $x_i$ of an s-dimensional rank-1 lattice $$L_{n,g} := \left\{ x_i := \frac{i}{n} g \bmod 1 \colon i = 0, \ldots, n-1 \right\} \subset [0, 1)^s \tag{5}$$

are generated by a suitable vector $g \in \mathbb{N}^s$. Rank-1 lattices $L_{n,a}$ in Korobov form use generator vectors of the restricted form $g=(1, a, a^2, \ldots, a^{s-1})$.

Using a van der Corput sequence (radical inverse) $\Phi_b$ in base b instead of the fraction i/n extends rank-1 lattices to rank-1 lattice sequences $$L_g^{\Phi_b} := \{x_i := \Phi_b(i) \cdot g \bmod 1 : i \in \mathbb{N}_0\} \subset [0,1)^s \tag{6}$$

in the sense that for any $m \in \mathbb{N}_0$ the first $b^m$ points $x_0, \ldots, x_{b^m-1}$ are a rank-1 lattice $L_{b^m,g}$.

The concept of maximized minimum distance (MMD) rank-1 lattices with applications to image synthesis and representation has been discussed above. Since lattices are closed under addition and subtraction, the minimum distance $$d_{min}(L_{n,g}) := \min_{n<i<n}\|x_i\| \tag{7}$$

of a rank-1 lattice $L_{n,g}$ is determined by the minimum norm of the lattice points themselves.

Due to the low-dimensional structure of many graphics applications, only s=2 dimensions are considered hereinbelow. However, even with the limitation s=2, the number n of required lattices points is so large that a native search algorithm for MMD rank-1 lattices, as well as tables, become prohibitive in time and space.

Thus, efficient approximate search algorithms are presented for MMD rank-1 lattices and sequences, and a method that searches rank-1 lattices in accordance with a given spectrum is introduced. Then the findings are applied to numerical integration and function approximation, i.e., image synthesis and texture representation.

6.2 Efficient Search by Restricting the Search Space

For some n there exists a construction for MMD rank-1 lattices, where the generator vector g and the number of lattice points ii are described by the sequence of convergents of the continued fraction equal to $\sqrt{3}$.

For other n the generator vector has to be determined by computer search. The native algorithm enumerates all possible generator vectors in order to find MMD lattices. Already for only s=2 dimensions, scanning $\mathcal{O}((n-1)^2)$ candidates becomes prohibitive for large n as used in our applications. Restricting the search space to lattices in Korobov form, the minimum distance can be determined efficiently by the spectral test. However, not all MMD rank-1 lattices can be represented in Korobov form.

In the following we examine a restriction of the search space for which the efficient search algorithm resembles rasterization algorithms as used in computer graphics.

6.2.1 Approximate Search for MMD Rank-1 Lattices

Two observations make it possible to outperform the native search algorithm: First, if the number n of lattice points is prime, all lattice points scaled by n are generator vectors. As a consequence all shortest vectors scaled by n must be generator vectors, too. Second, the largest possible minimum distance l would result from a point set, whose triangulation consists of only equilateral triangles (analogue to hexagonal lattices). Equating the area $$A = \frac{1}{n}$$

of the basis cell of a rank-1 lattice and twice the area of such an equilateral triangle of side length l yields $$A = \frac{1}{n} = 2\left(\frac{1}{2} \cdot l \cdot \sqrt{l^2 - \left(\frac{l}{2}\right)^2}\right) \Leftrightarrow l = \sqrt{\frac{2}{n \cdot \sqrt{3}}}. \quad (8)$$

Figure 8:
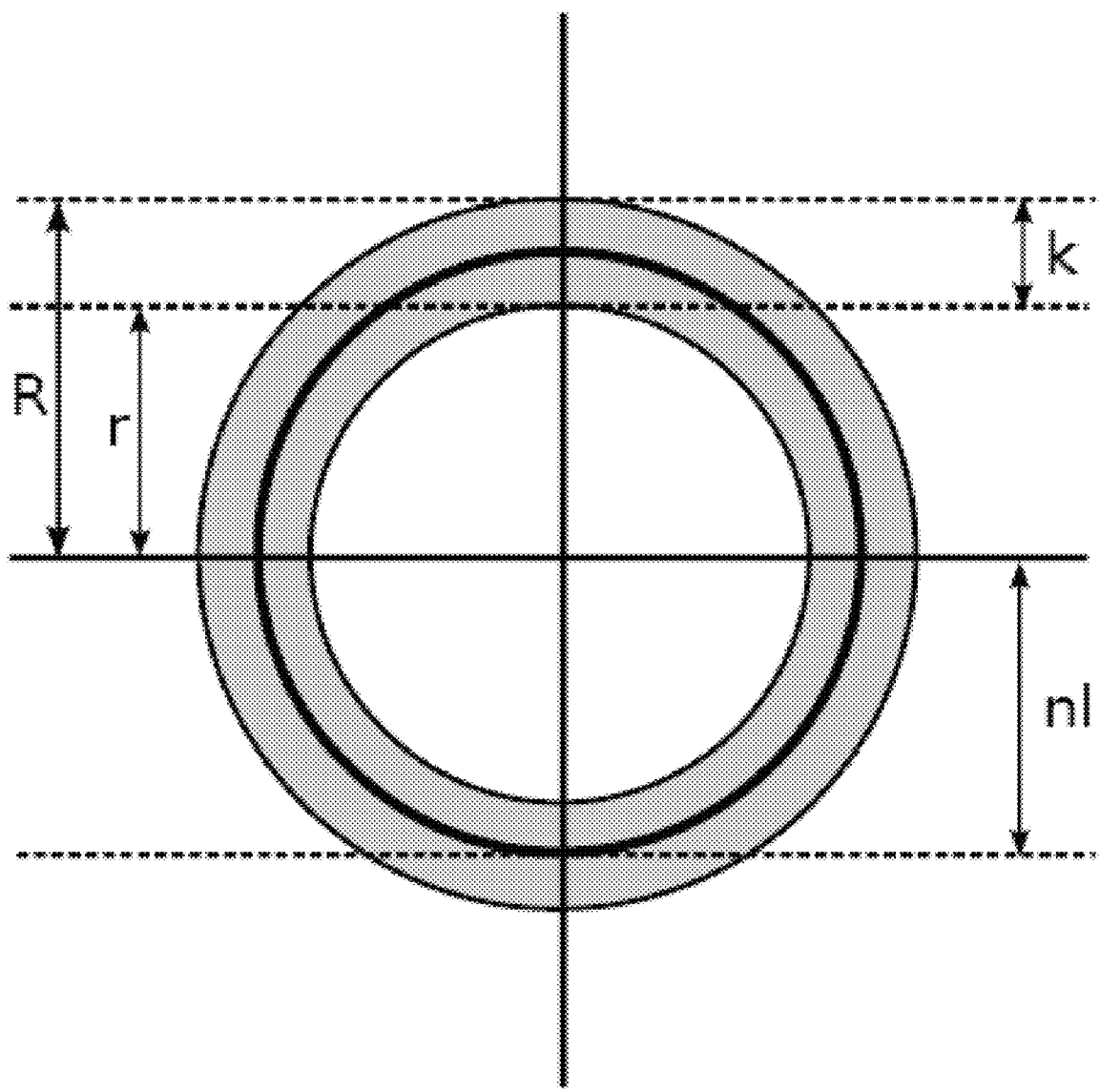
FIG. 8 is a diagram of an exemplary search space for generator vectors that is restricted to a ring around the origin.

FIG. 8 is a diagram of an exemplary restricted search space 160. The idea is to restrict the search space for generator vectors g to a ring around the origin with inner radius r and outer radius R, where $$r = n \cdot l - \frac{k}{2} < n \cdot l < n \cdot l + \frac{k}{2} = R, k \in \mathbb{N}$$

By rasterizing this ring on the integer lattice $\mathbb{N}^2$ using efficient algorithms from computer graphics, all potential generator vectors are enumerated. However, due to symmetry only one eighth of the ring needs to be rasterized. Fixing the ring width k independent of n, the rasterization runs in $\mathcal{O}(n \cdot l) = \mathcal{O}(\sqrt{n})$. The approximate search then runs in $\mathcal{O}(\sqrt{n} \log n)$; where the minimum distances are computed using Gaussian reduction. This complexity allows one to determine useful generator vectors for MMD rank-1 lattices on-the-fly.

6.2.1.1 Restriction of the Search Space

Figure 9:
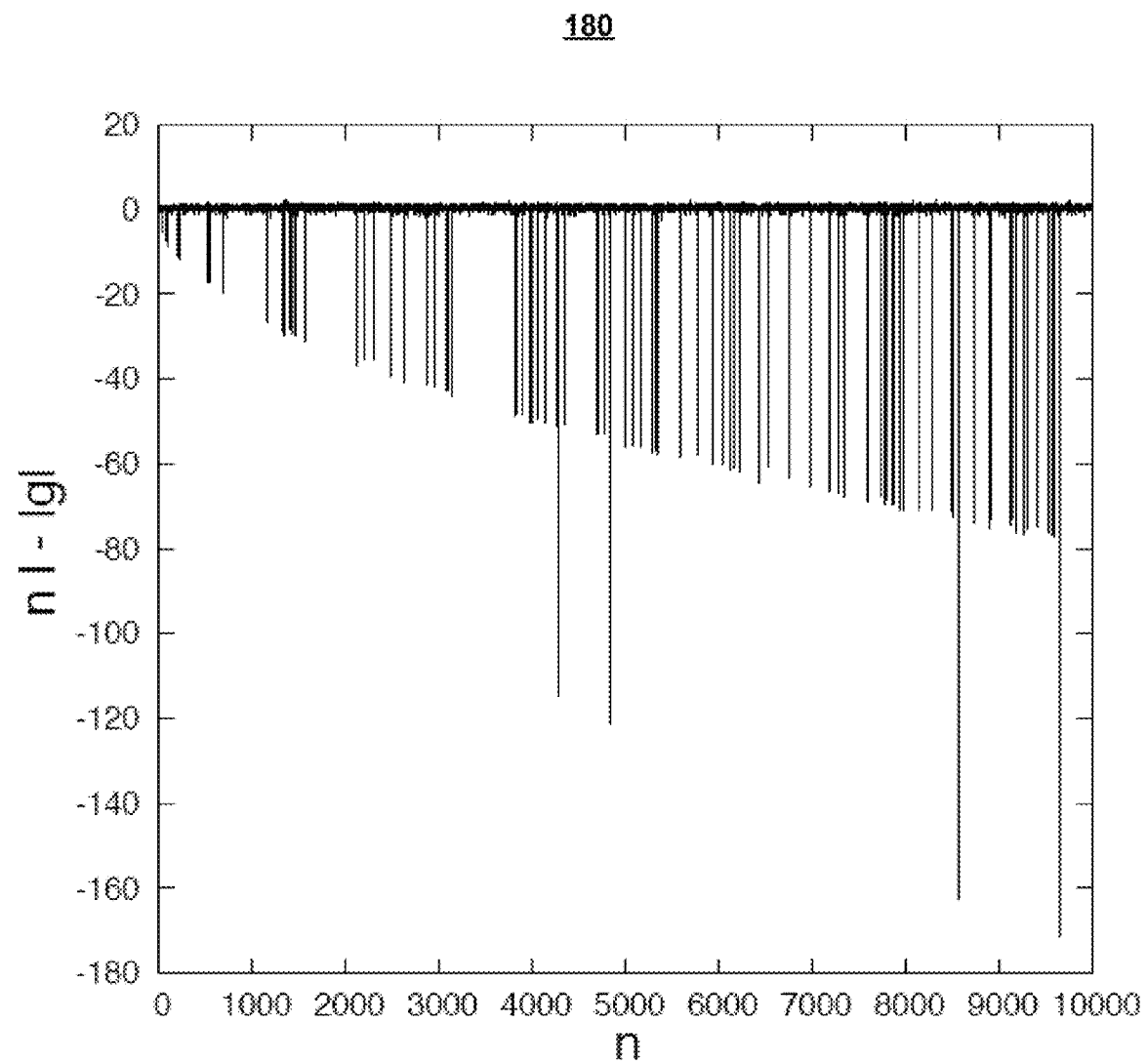
FIG. 9 is a graph that justifies the approach of restricting the search space to a ring of fixed width.

The difference $n \cdot l - \|g\|$ is computed for n=4 . . . 10000, where $\|g\|$ is the length of the shortest generator vectors found by exhaustive search. Note that the generator vectors are integer vectors and therefore l has to be scaled by n. FIG. 9 is a graph 180 that justifies the approach of restricting the search space to a ring of a fixed width k=R−r: k=4 already covers quite a lot of the shortest generator vectors. Due to the complexity of the exhaustive search, the range of n>10000 has been investigated for random samples only. Altogether, a value of k=6 has proven to be a quite reasonable ring width as described now.

6.2.1.2 Numerical Evidence

For n=4 . . . 10000 and the empirical k=6, the approximate rasterization search has been compared to the exhaustive search, i.e., the correct results. In 99.1% (i.e., 9908 out of 9997 cases), the latter algorithm finds the optimal generator vector with respect to maximized minimum distance. The number of lattices for which an optimal generator vector coincides with a shortest vector equals 71% (7098 cases), whereas in 28.1% (2810 cases) an optimal generator vector is determined inside the ring with width k, even if the generator vector is not a shortest vector. Otherwise the new search algorithm yields a maximized minimum distance that is never worse than 90% of the optimum.

Figures 10A, 10B, 10C:
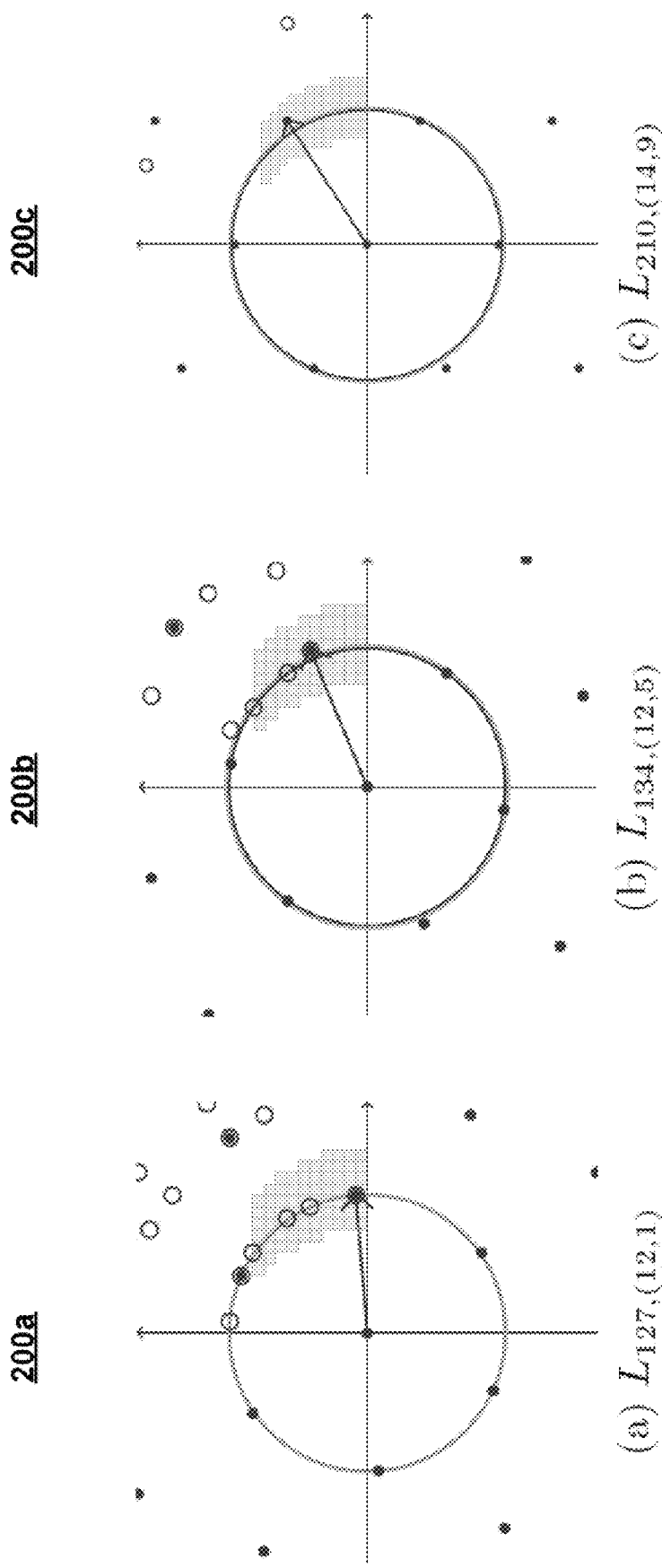
FIGS. 10A-C are a series of diagrams of exemplary spaces illustrating a rasterization search according to an aspect of the invention.
Figure 11:
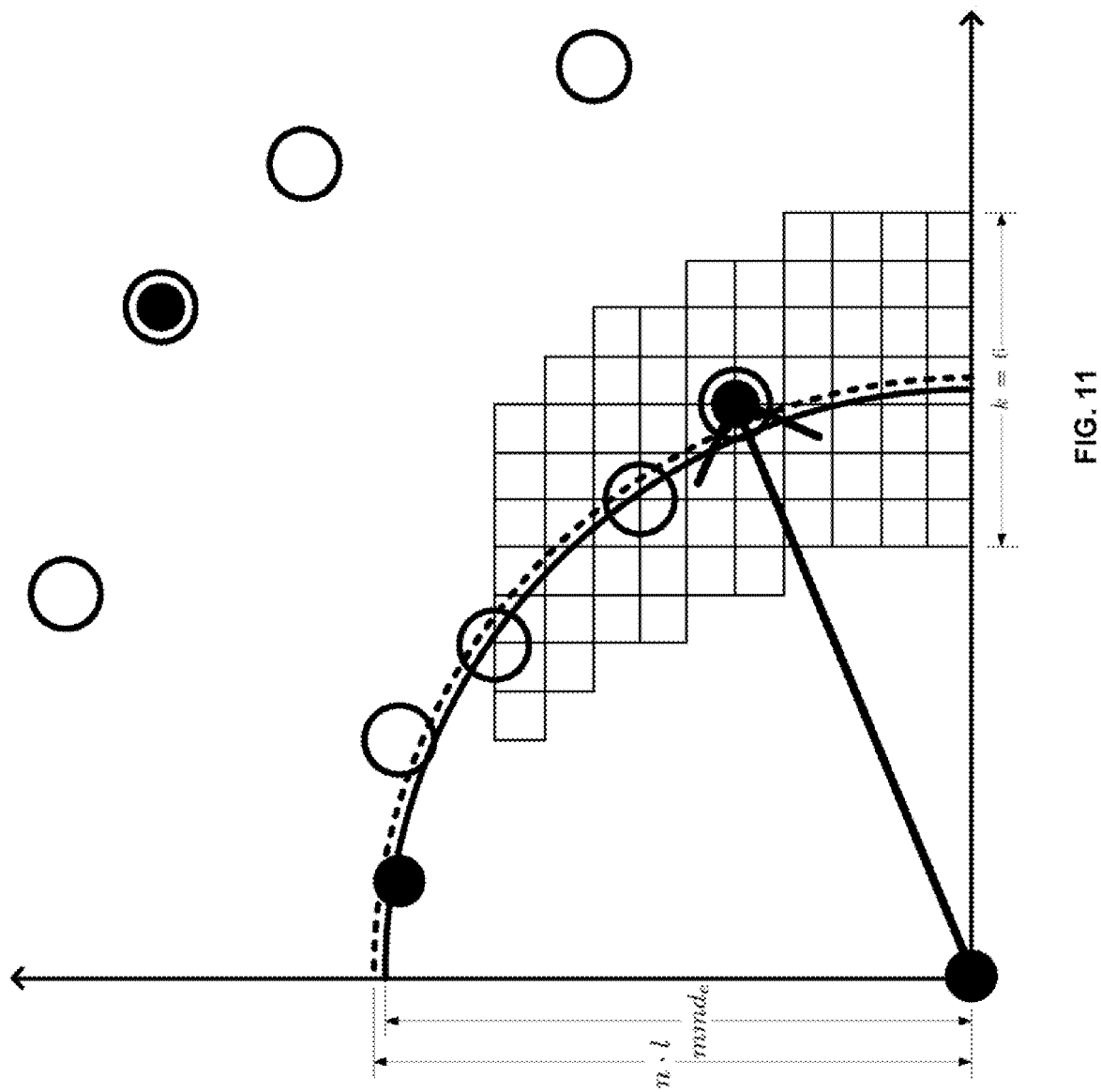
FIG. 11 is an enlarged view of the upper right quadrant of the exemplary space shown in FIG. 10B.

While the restricted search reports the correct results for it being prime, it is likely to also contain many other correct results. If the best generator vector is not found, at least an acceptable one is found. Examples for the different cases are visualized in FIGS. 10A-C, which are a series of diagrams of exemplary spaces 200a-c illustrating the rasterization search. FIG. 11 is an enlarged view of the upper right quadrant of the exemplary space 200b shown in FIG. 10B. The search space is depicted by the light gray squares, which represent the rasterized octant of a ring with radius n·l, and width k=6. As shown in FIG. 11, the outer circle, drawn in broken lines, has a radius n·l, while the radius of the inner circle, drawn using a solid line, is the maximized minimum distance $mmd_o$ determined by the exhaustive search. The set of generator vectors which result from this search algorithm and lie in the displayed range are plotted by the black hollow dots. The filled black dots belong to the lattice generated by the black vector as one element of the generator vectors resulting from the rasterization search with maximized minimum distance $mmd_r$. (a) n=127, $mmd_r$=$mmd_e$. The generator vector g=(12, 1) is a shortest vector in the lattice. (b) n=134, $mmd_r$=$mmd_e$, g=(12, 5) does not correspond to a shortest vector. (c) n=210, $mmd_r$<$mmd_e$.

Figure 12:
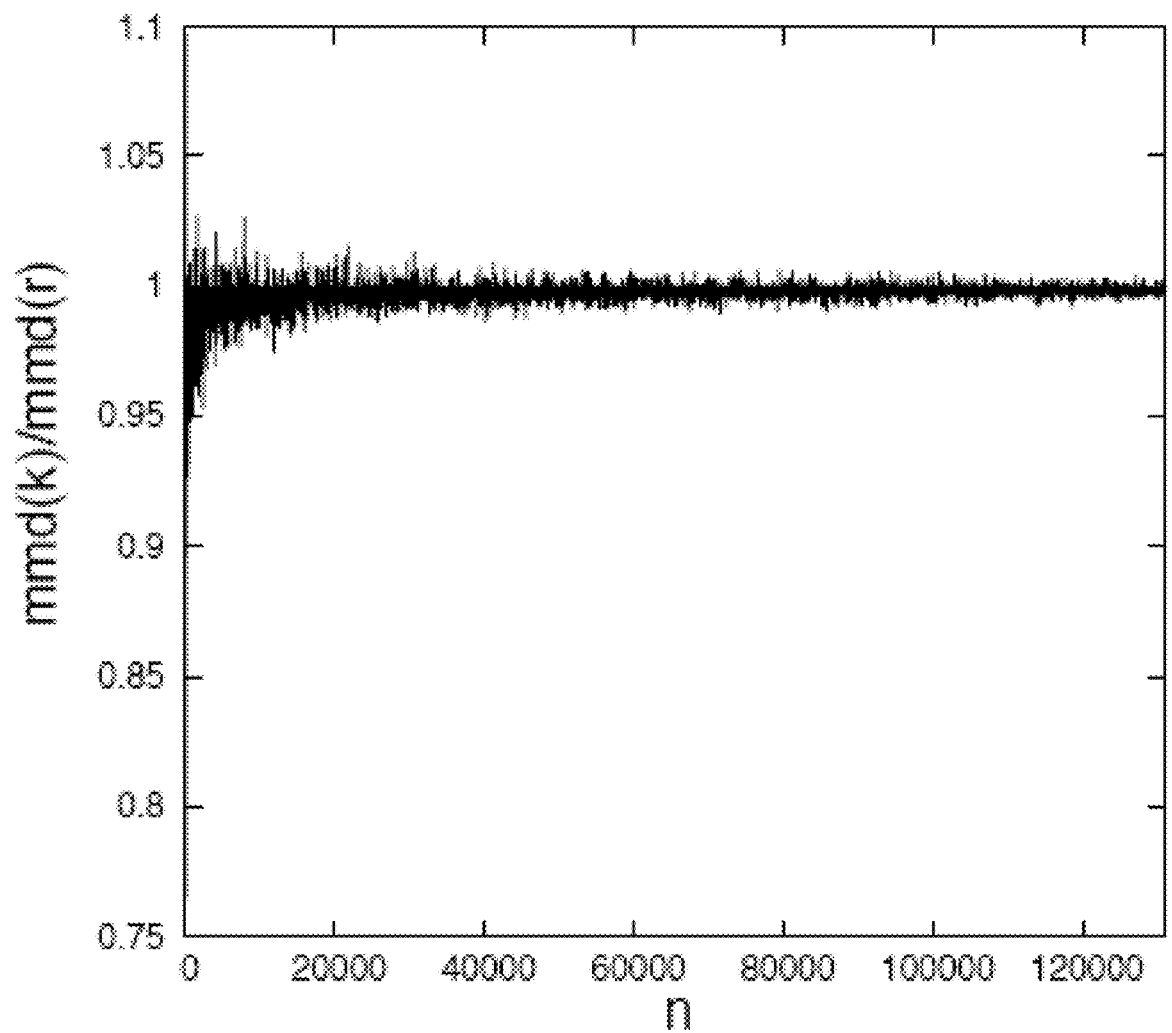
FIG. 12 is a graph comparing the maximized minimum distances resulting from searching MMD rank-1 lattices in Korobov form and the rasterization search.

FIG. 12 is a graph 220 of the maximized minimum distances resulting from searching MMD rank-1 lattices in Korobov form ($mmd_k$) and the rasterization ($mmd_r$) search are compared by plotting the ratio $mmd_k$=$mmd_r$ for n=4 . . . 10000, respectively. As apparent from the graphs the new search yields nearly optimal results with respect to the search criterion and delivers better results than Korobov form in most cases. More precisely, $mmd_r \geq mmd_k$ in 99.1% of the cases, $mmd_r > mmd_k$ in 6.2% of the cases, if the MMD rank-1 lattice cannot be represented in Korobov form, and $mmd_r$=$mmd_k$ in 93.2% of the cases.

6.2.2. Search for MMD Rank-1 Lattice Sequences

As defined in Section 1, a rank-1 lattice sequence $L_g^{\Phi_b}$ contains a sequence of rank-1 lattices $L_{b^m,g}$ for $m \in \mathbb{N}_0$. We search for rank-1 lattice sequences with maximized minimum distance in the sense that the weighted sum $$\sum_{m=m_{min}}^{m_{max}} (d_{min}(L_{b^m,g}))^2 b^m \quad (9)$$

is maximized. Scaling the squared minimum distance by $b^m$ gives equal importance to all lattices of the sequence since the area of a basis cell is $1/b^m$.

We examine two approaches to restrict the search space of the generator vectors, which yield similar results.

6.2.2.1 Lattice Sequence Based on an Initial MMD Rank-1 Lattice

For $k \in \mathbb{N}_0$ and a fixed m, each set of points $$\{x_{k \cdot b^m}, \ldots, x_{(k+1)b^m-1}\} \subset L_g^{\Phi_b}$$

is a copy of $L_{b^m,g}$ shifted by $\Delta(k) := \Phi_b(k)b^{-m}g$. The minimum distance of all copies is identical, as $d_{min}$ is shift invariant. For the example of $L_{(1,3)}^{\Phi_2}$, this structural property is depicted in FIGS. 13A-D, which are a series of graphs 240a-d illustrating the shifted lattices $$L_{8,(1,3)} + \Delta(k) = L_{8,(1,3)} + \Phi_2(k)2^{-3}(1,3) \text{ for } k=0, 1, 2, 3$$

There are now considered two-dimensional generator vectors $g=(g_1,g_2)$ with $\gcd(n,g_1,g_2)=1$. Then all points of the rank-1 lattice sequence $L_g^{\Phi_b}$ lie on at most $n_h=g_1+g_2-1$ hyperplanes, independent on the number of points. As a consequence, all points of the previous example $L_{(1,3)}^{\Phi_2}$ reside on at most three hyperplanes, as shown in FIGS. 14A-D, which are a series of graphs 260a-d, illustrating the lattices $L_{2^m,(1,3)}$ of the lattice sequence $L_{(1,3)}^{\Phi_2}$ started with the initial rank-1 lattice $L_{8,(1,3)}$. This means that the generator vector has to be modified such that the undesirable uniform bound on the minimum distance induced by the number of hyperplanes is improved. Considering generator vectors of the form $$g_{i,j} := (g_1 + i \cdot b^m, g_2 + j \cdot b^m) \text{ for } i,j \in \mathbb{N}_0,$$

we have $g_{i,j} \equiv g \mod b^m$. As a consequence $L_{b^m,g} = L_{b^m,g_{i,j}}$; i.e., the minimum distance remains unchanged for $b^m$ points. However, the number of hyperplanes is increased to $n_h = g_1 + i \cdot b^m + g_2 + j \cdot b^m - 1$, as desired.

For example $L_{(41,11)}^{101\,2}$ with $(41, 11) = (1+5 \cdot 8, 3+1 \cdot 8)$ does not restrict points to only three hyperplanes, but for n=8 points generates the same rank-1 lattice as $L_{(1,3)}^{\Phi_2}$, i.e., $L_{8,(1,3)} = L_{8,(41,11)}$ (compare FIGS. 13A-D and 14A-D).

The search procedure is started by selecting both a minimum number of points $b^{m_{min}}$ and maximum $b^{m_{max}}$. First, a search from the previous section is run to find an initial MMD rank-1 lattice generator vector g for $b^{m_{min}}$ points. Then the sum of minimum distances (9) is evaluated for each potential generator vector $g_{i,j}$ in order to find the maximum, where the search range is determined by $$g_1 + i \cdot b^{m_{min}} \le b^{m_{max}} \Rightarrow i \le \frac{b^{m_{max}} - g_1}{b^{m_{min}}} < b^{m_{max}-m_{min}} \text{ and}$$

$$g_2 + j \cdot b^{m_{min}} \le b^{m_{max}} \Rightarrow j \le \frac{b^{m_{max}} - g_2}{b^{m_{min}}} < b^{m_{max}-m_{min}}.$$

Due to symmetry, an obvious optimization is to bound the range of j by $b^{m_{max}-m_{max}}-i$. Minimum distances are computed using the Gaussian basis reduction. An example result of the search is illustrated in FIGS. 15A-H, where minimum distances obtained by the rank-1 lattice sequence are compared to the distances that can be obtained by rank-1 lattices alone.

Specifically, FIGS. 15A-H show a series of graphs 280a-h illustrating the searching for an MMD rank-1 lattice sequence for the initial lattice $L_{2^3,(1,3)}$ and $m_{max}=7$, yielding $L_{(41,11)}^{\Phi_2}$ with $g_{5,1}=(1+5 \cdot 2^3, 3+1+1 \cdot 2^3)=(41, 11)$. The gray lines show all possible hyperplanes. For each lattice of the rank-1 lattice sequence, its minimum distance $d(m):=d_{min(Lb^m,g)}^2 b^m$ to the maximum minimum distance that can be obtained by a single rank-1 lattice.

6.2.2.2 Approximate Search by Restricting the Search Space

In the second approach the search is not based on an initial MMD rank-1 lattice. Instead we choose $m_{min}=1$ and fix a value for in $m_{max}$, looking for a generator vector that maximizes Equation (9).

In order to accelerate the search process, the search space can be restricted using the same strategy as in the rasterization search algorithm for rank-1 lattices (see Section 6.2.1). Then the search space is the union of the restricted search spaces for $L_{b^m,g}$, $1 < m \le m_{max}$. In experiments, the restricted search achieved the same results as the exhaustive computer search for $n_{max} := b^{m_{max}} \le 256$ and b=2, 3, 4, simultaneously reducing the run-time from $\mathcal{O}(n_{max}^2 \log n_{max})$ to $\mathcal{O}(\sqrt{n_{max}} \log n_{max})$.

Comparing the minimum distances of the first $b^m$ points of the sequence of this algorithm to the first approach, the sum of the minimum distances of the approach based on an initial MMD rank-1 lattice is less or equal to the sum of minimum distances of the second approach. Thereby the minimum distances are summed over the same range of m. Although the second approach is more general than the first one, the lattices produced by the sequence might not necessarily have the maximal possible minimum distance for the corresponding $n=b^m$ points, which is assured at least for the initial lattice in the first approach.

FIGS. 16A-G are a series of graphs 300a-g showing the resulting lattice sequence for b=3 and $m_{max}=7$, while FIG. 17 is a table 320 that compares the minimum distances for the first $b^m$ points of the lattice sequences resulting from both search algorithms presented in this section. By definition for m=2 the lattice of the sequence $L_{(82,129)}^{\Phi_3}$ represents an MMD rank-1 lattice, whereas for m=3 the rank-1 lattice of the sequence $L_{(47,19)}^{\Phi_3}$ achieves the maximal possible minimum distance as well.

6.3 Search of Anisotropic Rank-1 Lattices to Approximate Spectra

The Fourier transform of a rank-1 lattice $L_{n,g}$ exactly yields its dual lattice $L_{n,g}^\perp$ This means that we can describe the spectrum $S_{n,g}$ of $L_{n,g}$ by the fundamental Voronoi cell of $L_{n,g}^\perp$ which is further characterized by its orientation at $\vec{w}_L$ and width $w_L$. These parameters are computed by means of the basis $B^\perp$ of $L_{n,g}^\perp$. Given a lattice basis $B=(b_1 b_2)^T$ the dual basis can be easily determined by $B^\perp = (B^{-1})^T$. In order to assure that $B^\perp$ spans the Delaunay triangulation and thus the Voronoi diagram, the dual basis has to be reduced, for example using the Gaussian basis reduction.

Let $$v := \begin{cases} b_1^\perp + b_2^\perp & \text{if } b_1^\perp \cdot b_2^\perp < 0 \\ b_2^\perp - b_1^\perp & \text{else} \end{cases}$$

be the diagonal of the basis cell spanned by $b_1^\perp$ and $b_2^\perp$ such that v and $b_1^\perp$ or rather v and $b_2^\perp$, form a valid basis of the dual lattice as well. Then, the orientation of the fundamental Voronoi cell is approximated by $$\vec{\omega}_L := b_2^\perp + v = \begin{cases} 2 \cdot b_2^\perp + b_1^\perp & \text{if } b_1^\perp \cdot b_2^\perp < 0 \\ 2 \cdot b_2^\perp - b_1^\perp & \text{else.} \end{cases} \quad (10)$$

The width $w_L$ of $S_{n,g}$ is defined as the length of the shortest basis vector normalized by the hexagonal bound l, i.e., $$w_L = \frac{|b_1^\perp|}{l \cdot n}. \quad (11)$$

Note that l·n also represents an upper bound on the maximized minimum distance of the dual lattice, as the length of shortest vector in $L_{n,g}^\perp$ corresponds to the length of the shortest vector in $L_{n,g}$ scaled by n.

The spectrum $\mathcal{T}_{d,w}$, according to which we want to search the rank-1 lattice, is specified by its main direction, i.e., orientation, $d \in \mathbb{R}^2$ and its width w. The two-dimensional vector d and the scalar w are passed as an input parameter to the lattice search by an application. The width w takes values in the range of [0, 1] and represents the measure of desired anisotropy. w=0 stands for the most anisotropic spectrum, whereas w=1 denotes the isotropic one. Note that we have to allow $g_i$=0, i=1, 2 for the generator vector in order to be able to approximate spectra aligned to axes of the Cartesian coordinate system.

For $n \in \mathbb{N}$ the search algorithm steps through all distinct lattices. This can be realized for example by using an n×n array, where the generator vectors of identical lattices are marked. Given any $g \in [0, n)^2$, the set of vectors yielding identical lattices is {k·g mod n:gcd(n,k)=1, k=1, . . . , n−1}.

After computing a Minkowski-reduced dual basis, for each dual lattice the orientation and width of the fundamental Voronoi cell are determined according to Equations (10) and (11). Then the lattices are sorted with respect to $|w_L - w|$. For the smallest difference the lattice is chosen, the orientation of which $\vec{w}_L$ best approximates the main direction d of $\mathcal{T}_{d,w}$. Thereby the similarity sim between those two vectors is measured by calculating the cosine of the angle between $\vec{w}_L$ and d $$sim = \frac{d \cdot \vec{\omega}_L}{\|d\| \cdot \|\vec{\omega}_L\|}.$$

FIGS. 18A-F show a series of graphs 340a-f illustrating an example for anisotropic rank-1 lattices having n=56 points, where the spectrum is specified by d=(cos α, sin α) with α−303° and the width varies from 0.1 to 1.0 in steps of 0.1. Using the Gaussian reduction for the lattice basis search, the algorithm runs in $\mathcal{O}(n^2 \log n)$.

6.4 Weighted Norms

Given a regular matrix $B^r$, it is possible to generalize the search to the domain spanned by the column vectors of $B^r$. All that needs to be done is considering the weighted norm $\|B^r x_i\|^2$ in the definition of the minimum distance in Equation (7) instead of the Euclidean norm. Note that as before the distance to the origin has to be computed with respect to the unit torus.

6.4.1 Searching by Rasterization

For the special case of scaled rectangular domains, i.e., $$B^r = (b_1^r b_2^r) = \left( \begin{pmatrix} x \\ 0 \end{pmatrix} \begin{pmatrix} 0 \\ y \end{pmatrix} \right),$$

the rasterization search can be adapted easily. Therefore the lattice basis B has to be transformed into world coordinates before computing its determinant, i.e., area A. For the "weighted" lattice basis $B^w = B^r \cdot B$ the area of the basis cell is $$A = |\det B^w| = |\det B^r| \cdot |\det B| = \frac{x \cdot y}{n} \Rightarrow l = \sqrt{\frac{2 \cdot x \cdot y}{n \cdot \sqrt{3}}}$$

in analogy to Equation (8).

Since we perform the rasterization directly in the sheared basis, the shortest vectors lie within an ellipse. Its axes, $a_x =$ $$\begin{pmatrix} \frac{n \cdot l}{x} \\ 0 \end{pmatrix} \text{ and } a_y = \begin{pmatrix} 0 \\ \frac{n \cdot l}{y} \end{pmatrix}$$

result from transforming the circle axes $$\begin{pmatrix} n \cdot l \\ 0 \end{pmatrix} \text{ and } \begin{pmatrix} 0 \\ n \cdot l \end{pmatrix}$$

into the sheared basis $B^r$ of the actual region.

FIGS. 19A-B show a pair of rectangles 360a and 360b illustrating searching on a rectangular domain. FIG. 19A shows an MMD rank-1 lattice $L_{512(4,45)}$ in a domain of width-to-height ratio x:y=4:1 in world coordinates. FIG. 19B shows the same lattice in the scaled basis with x:y=1:1. The search region becomes an ellipse.

As the rasterization runs in less than $\mathcal{O}(\|a_x\| + \|a_y\|)$, with $\|a_x\|, \|a_y\| \in \mathcal{O}(\sqrt{n})$, there is still a complexity of $\mathcal{O}(\sqrt{n})$. Finally the Gaussian reduction needs to be adapted to weighted norms in order to compute the minimum distance. For that purpose the only modification consists in weighting the initial basis before performing the reduction steps. Therefore the search algorithm maintains a complexity of $\mathcal{O}(\sqrt{n} \log n)$.

6.4.2 Anisotropic Rank-1 Lattices

Using the above-described techniques from Section 6.3 with weighted norms only requires the transformation of the desired main direction $d \in \mathbb{R}^2$ into the sheared basis $B^r$ of the desired domain.

6.5 Applications

Figure 21:
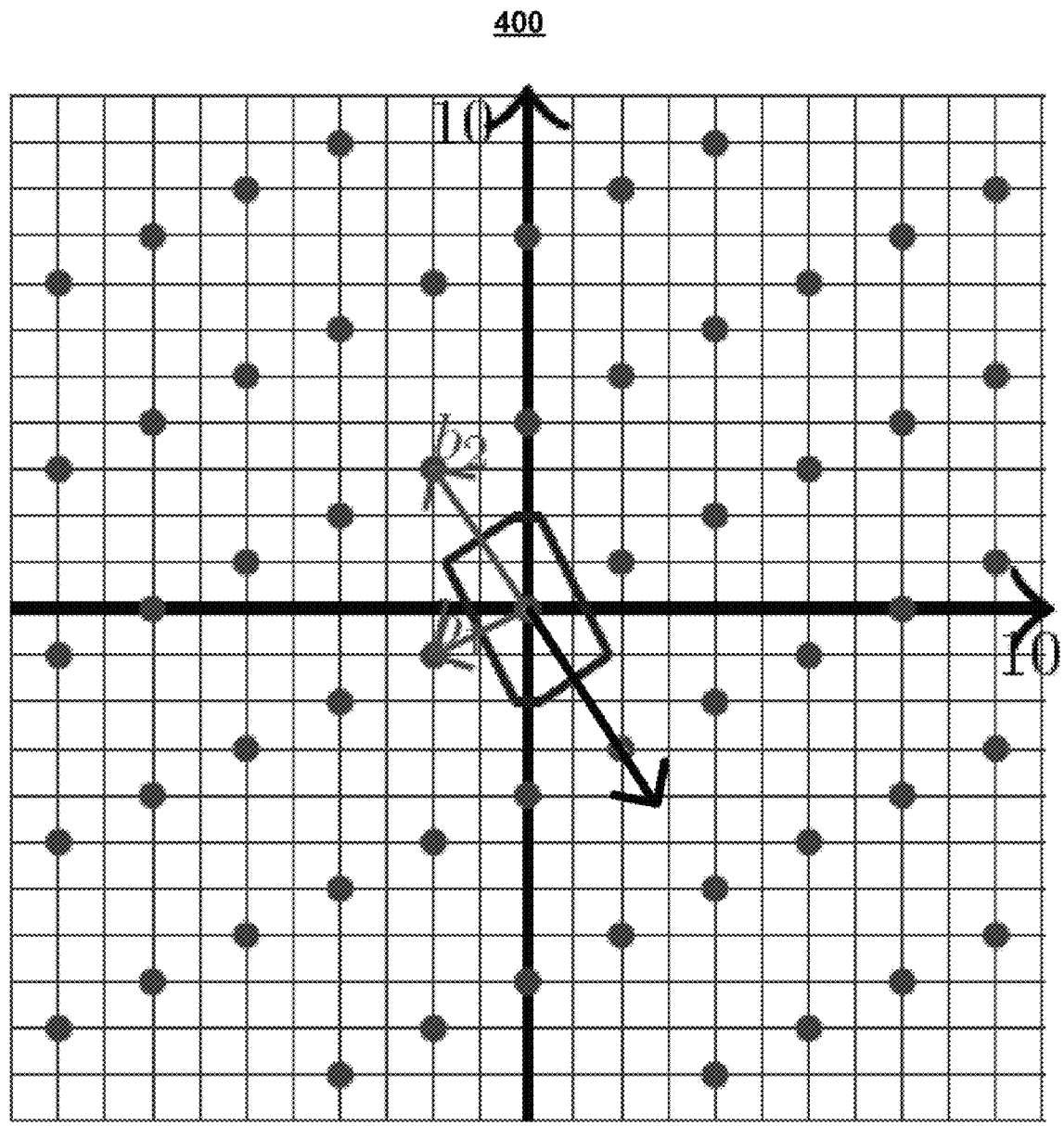

The search techniques described above allow one to find suitable generator vectors for graphics applications much more rapidly. Here, we introduce two new applications of anisotropic rank-1 lattices. FIGS. 20 and 21 illustrate an example of searching a rank-1 lattice according to the spectrum (1, 0) by a weighted norm. FIG. 20 shows a diagram of lattice $L_{8(3,2)}$ 380a for the spectrum (1,0) with similarity ≈0.998 in the shared basis of $L_{1048564,33919}$. FIG. 21 is a diagram of the dual 400 of the lattice $L_{8(3,2)}$ along with the transformed spectrum vector (1,0).

6.5.1 Anti-Aliasing by Anisotropic Rank-1 Lattices

By adapting the quadrature rule to the spectrum of the integrand, aliasing artifacts can be reduced. The improved anti-aliasing has been illustrated by a comparison of images of infinite checkerboards rendered with 16 samples per pixel. In a first image, the same MMD rank-1 lattice $L_{16,(1,4)}$ was used for all pixels. In a second image, an anisotropic MMD rank-1 lattice adapted to the spectrum of each pixel was used. Comparing the second image to the first image, it was apparent that some aliases under the horizon were significantly attenuated.

Given the techniques described above, an anisotropic MMD rank-1 lattice is specified by the main direction d and the width w. Maximum anisotropy is globally assumed by fixing w=0. The main direction d is determined by projecting the normal of the first object intersected by a ray through the center of a pixel onto the image plane and normalizing the resulting vector.

This way the samples from the anisotropic MMD rank-1 lattice in the pixel become isotropic and more uniform, when projected onto the surface seen in the scene. As a consequence the surface samples are averaged more efficiently resulting in reduced aliasing. Note that for this argument, it is assumed that there is only one plane perpendicular to the normal seen through a pixel, which is a useful approximation in many cases.

As the perspective projection does not have an impact on the variance of the checkerboard until a certain distance from the camera, anisotropic rank-1 lattices are used only for those pixels for which the hit point of a ray through a pixel midpoint and the checkerboard exceeds a certain distance to the camera, which is determined experimentally for this special setting. Otherwise MMD rank-1 lattices are used per pixel.

Figure 22:
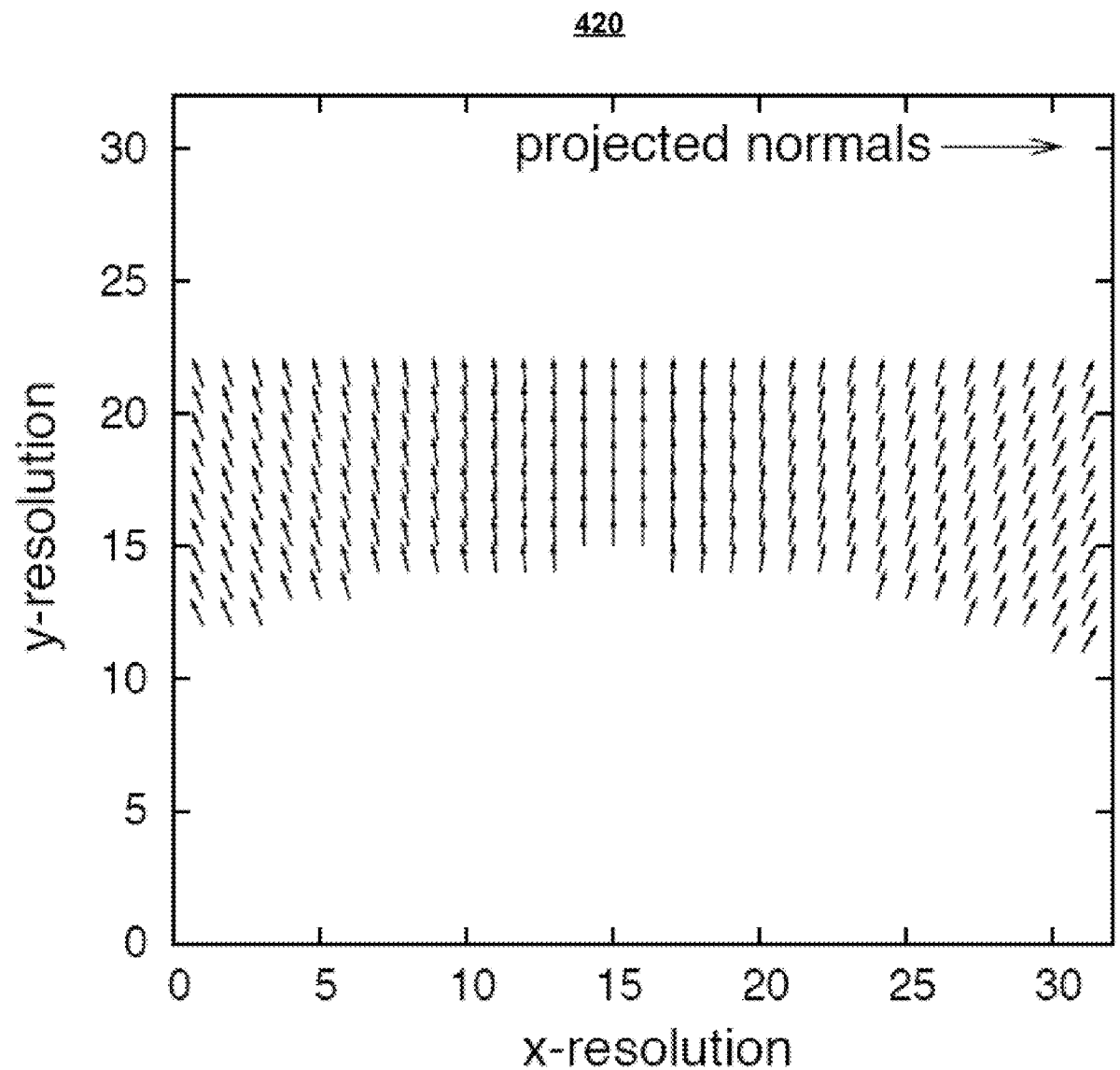
FIG. 22 is a graph indicating pixels and directions for which anisotropic rank-1 lattices are used in an infinite checkerboard.
Figure 23:
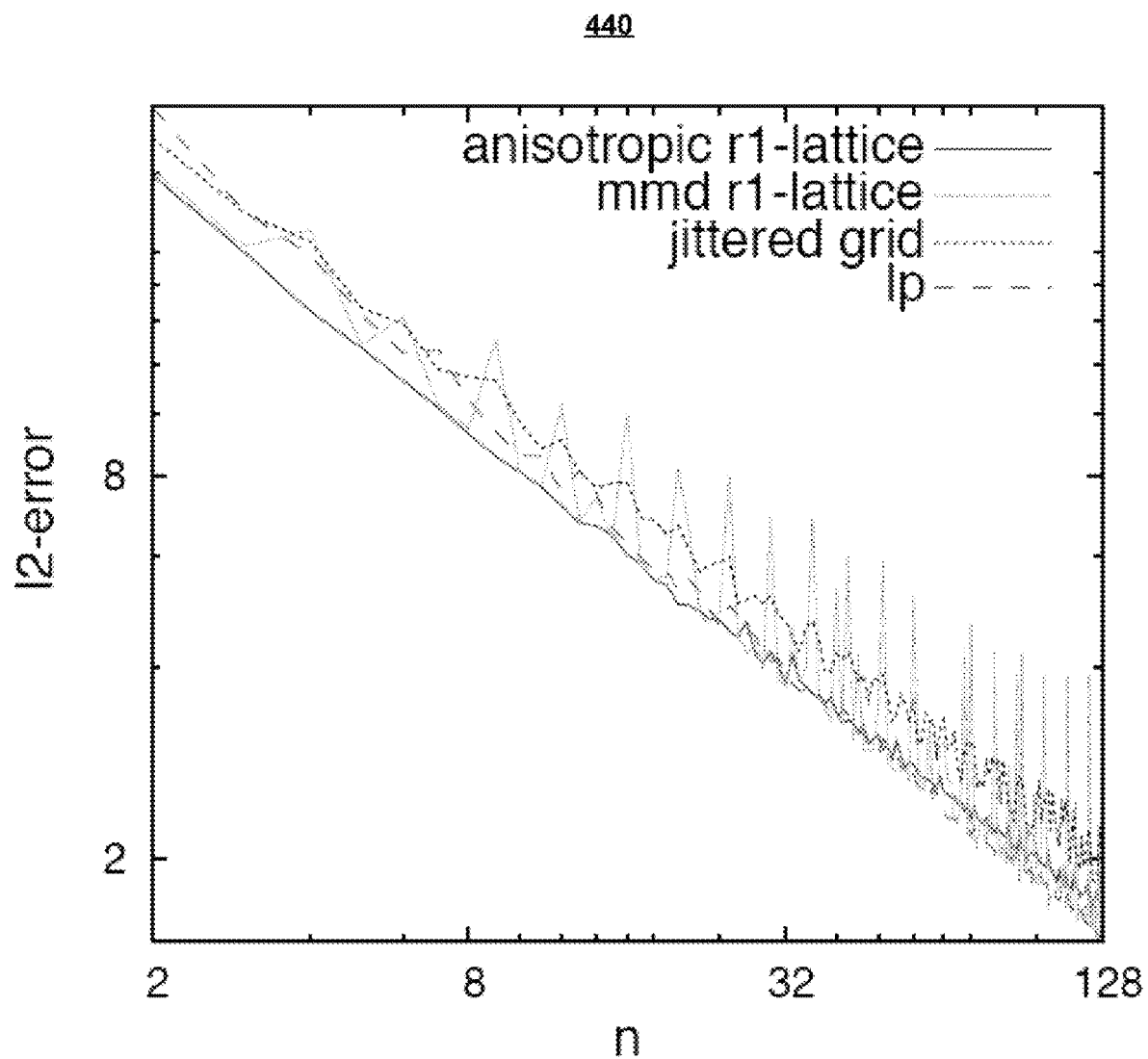
FIG. 23 is a graph comparing anisotropic rank-1 lattices, MMD rank-1 lattices, jittered grid and Larcher-Pillichshammer points.

FIG. 22 is a graph 420, in which the arrows indicate the pixels and directions for which anisotropic rank-1 lattices are used in an infinite checkerboard. FIG. 23 is a graph 440 comparing anisotropic rank-1 lattices, MMD rank-1 lattices, jittered grid and Larcher-Pillichshammer points.

In FIG. 23, anisotropic rank-1 lattices were compared to MMD rank-1 lattices, jittered grid and Larcher-Pillichshammer points by computing the $L_2$-norm of a converged reference image to the corresponding test images for an increasing number of sampling points per pixel. Both axes in the error graph were scaled logarithmically; the reference image was computed by applying a jittered grid sampling pattern with 1024×1024 samples at each pixel. It was observed that using the anisotropic rank-1 lattice outperforms the other sampling patterns, especially for lower sampling rates. In contrast to the MMD rank-1 lattices, the error curve of the anisotropic lattices does not display a strong oscillations However, for larger numbers of samples, the Larcher-Pillichshammer points still show the fastest convergence. It is speculated that this is due to fixing the width w.

6.5.2 Rank-1 Lattice Images and Textures

Described above are systems and techniques in which the Voronoi diagram of MMD rank-1 lattices is used as an approximation to hexagonal pixel layout. While the visual quality at the same number of pixels is superior to classic rectangular layouts, the algorithms are simpler than for hexagonal layouts.

If now an image, or more specific a texture, exposes an anisotropy, anisotropic MMD rank-1 lattices can be used to further improve the visual appearance, i.e., approximation power. This has been illustrated, in one example, for a wood grain texture, which exposes one main direction with large variance.

The parameters for determining the anisotropic MMD rank-1 lattice are computed from the structure tensor of each pixel. Without loss of generality let $\lambda_{1,i} > \lambda_{2,i}$ be the eigenvalues of the structure tensor and $v_{1,i}$ and $v_{2,i}$ the corresponding eigenvectors for each pixel $i \in [0, xRes \cdot yRes)$. Then the main direction $$d = \sum_{i=0}^{xRes \cdot yRes} v_{1,i}$$

is computed by averaging the eigenvector of the largest eigenvalue. The width $$w = 1.0 - \frac{1}{A_{max}} \cdot \sum_{i=0}^{xRes \cdot yRes} \frac{\lambda_{1,i}}{\lambda_{2,i}}$$

subtracts the normalized texture anisotropy from 1, since 0 means maximum anisotropy for the search algorithm, as discussed above. The normalization constant $A_{max}$ must be determined experimentally for a set of textures.

Figure 24:
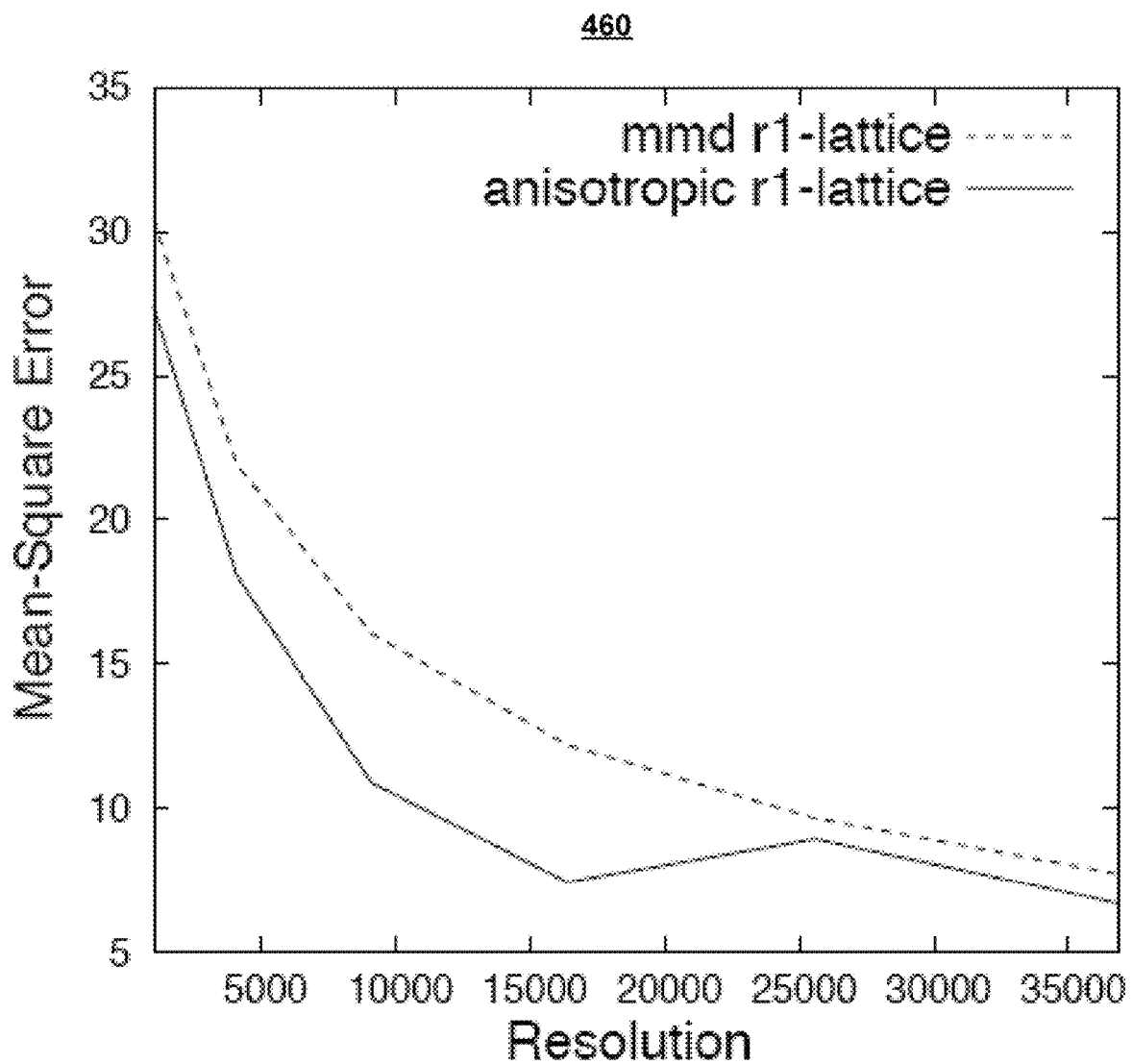
FIG. 24 is an error graph showing the different approximate qualities measured with respect to a reference image.

FIG. 24 is an error graph 460 showing the different approximate qualities measured with respect to a reference image. In FIG. 24, isotropic rank-1 lattice textures are compared to anisotropic ones by means of the $L_2$-error of the test images to a reference solution for an increasing number of lattice points for the source image. As can be seen in the error graph 460, the anisotropic rank-1 lattice textures were found to be superior, as they were able to capture even small details, which are lost in the isotropic case.

7. Digital Processing Environments in which Invention can be Implemented

Figure 25:
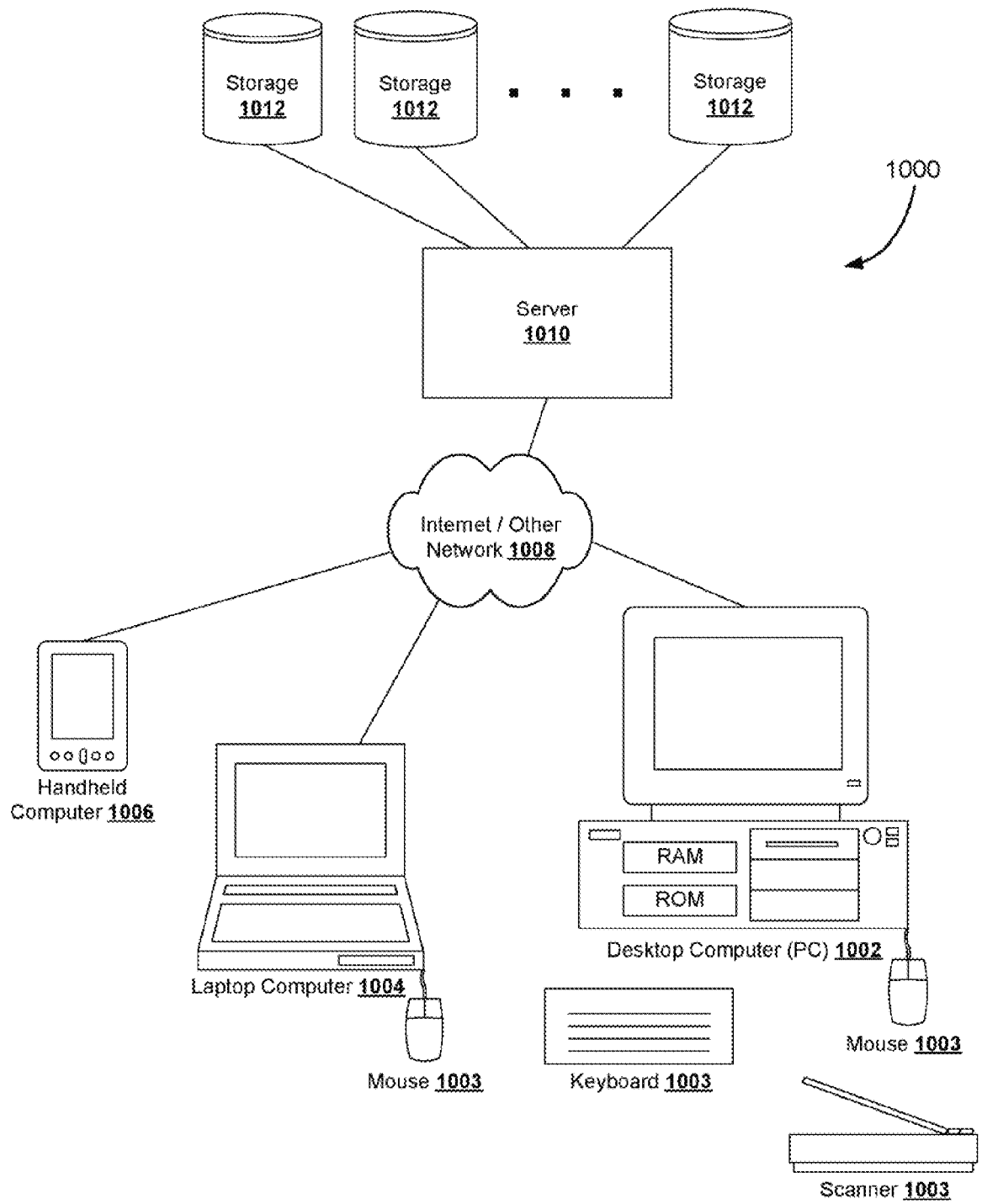
FIGS. 25 and 26 are diagrams of underlying digital processing structures and environments in which aspect of the invention may be implemented and practiced.
Figure 26:
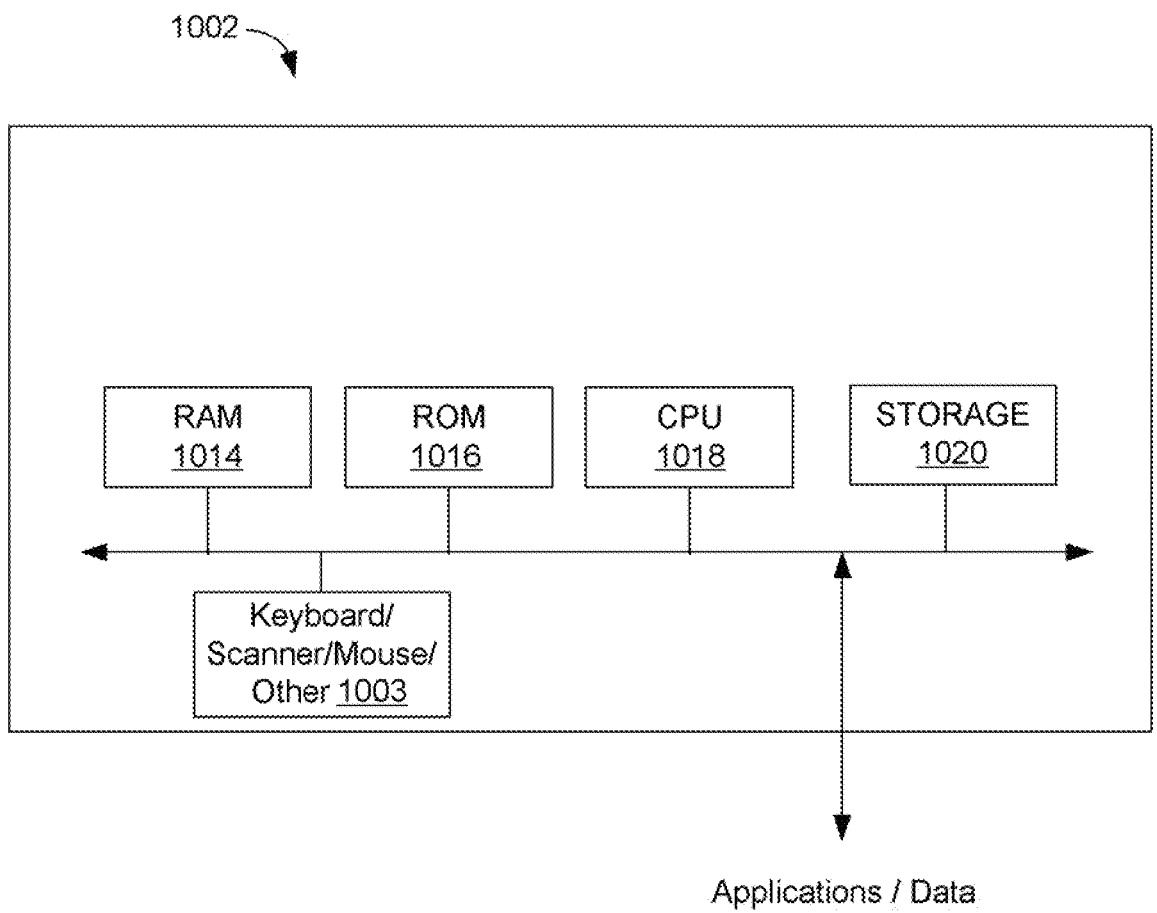

Having described examples and embodiments of the invention above, the following is a discussion, to be read in connection with the FIGS. 25 and 26, of underlying digital processing structures and environments in which the invention may be implemented and practiced. It will be understood by those skilled in the art that the present invention provides methods, systems, devices and computer program products that enable more efficient activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of tile computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The detailed description herein illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 25 depicts an illustrative computer system 1000 that can carry out such computer graphics processes. With reference to FIG. 25, the computer system 1000 in one embodiment includes a processor module and operator interface elements comprising operator input components such as a keyboard and/or a mouse (or digitizing tablet or other analogous element(s), generally identified as operator input element(s) ) and an operator output element such as a video display device. The illustrative computer system 1000 can be of a conventional stored-program computer architecture. The processor module can include, for example, one or more processor, memory and mass storage devices, such as disk and/or tape storage elements (not separately shown), which perform processing and storage operations in connection with digital data provided thereto. The operator input element(s) can be provided to permit an operator to input information for processing. The video display device can be provided to display output information generated by the processor module on a screen to the operator, including data that the operator may input for processing, information that the operator may input to control processing, as well as information generated during processing. The processor module can generate information for display by the video display device using a so-called "graphical user interface" ("GUI"), in which information for various applications programs is displayed using various "windows."

Although the computer system is shown as comprising particular components, such as the keyboard and mouse for receiving input information from an operator, and a video display device for displaying output information to the operator, it will be appreciated that the computer system may include a variety of components in addition to or instead of those depicted in FIG. 25.

In addition, the processor module can include one or more network ports, which are connected to communication links which connect the computer system in a computer network. The network ports enable the computer system to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system shown in the drawings, methods, devices or software products in accordance with the present invention can operate on any of a wide range of conventional computing devices and systems, such as those depicted in FIG. 25 as a network system 1000, whether standalone, networked, portable or fixed, including conventional PCs 1002, laptops 1004, handheld or mobile computers 1006, or across the Internet or other networks 1008, which may in turn include servers 1010 and storage 1012.

In accordance with conventional computer software and hardware practice, a software application configured in accordance with the invention can operate within, e.g., a PC 1002 like that shown in FIGS. 25 and 26, in which program instructions can be read from ROM or CD ROM 1016 (FIG. 26), magnetic disk or other storage 1020 and loaded into RAM 1014 for execution by CPU 1018. Data can be input into the system via any known device or means, including a conventional keyboard, scanner, mouse, digitizing tablet, or other elements 1003.

Those skilled in the art will understand that the method aspects of the invention described herein can be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently-available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown, and to implement processing modules within processing system 1002, for carrying out a method in accordance with the invention. It will be further appreciated that the presently described systems and techniques may also be applied with respect to FPGAs, GPUs, and accelerator units in general.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element. or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts, are not necessarily part of the present invention, and their selection can be left to the implementer.

8. General Technique

Figure 27:
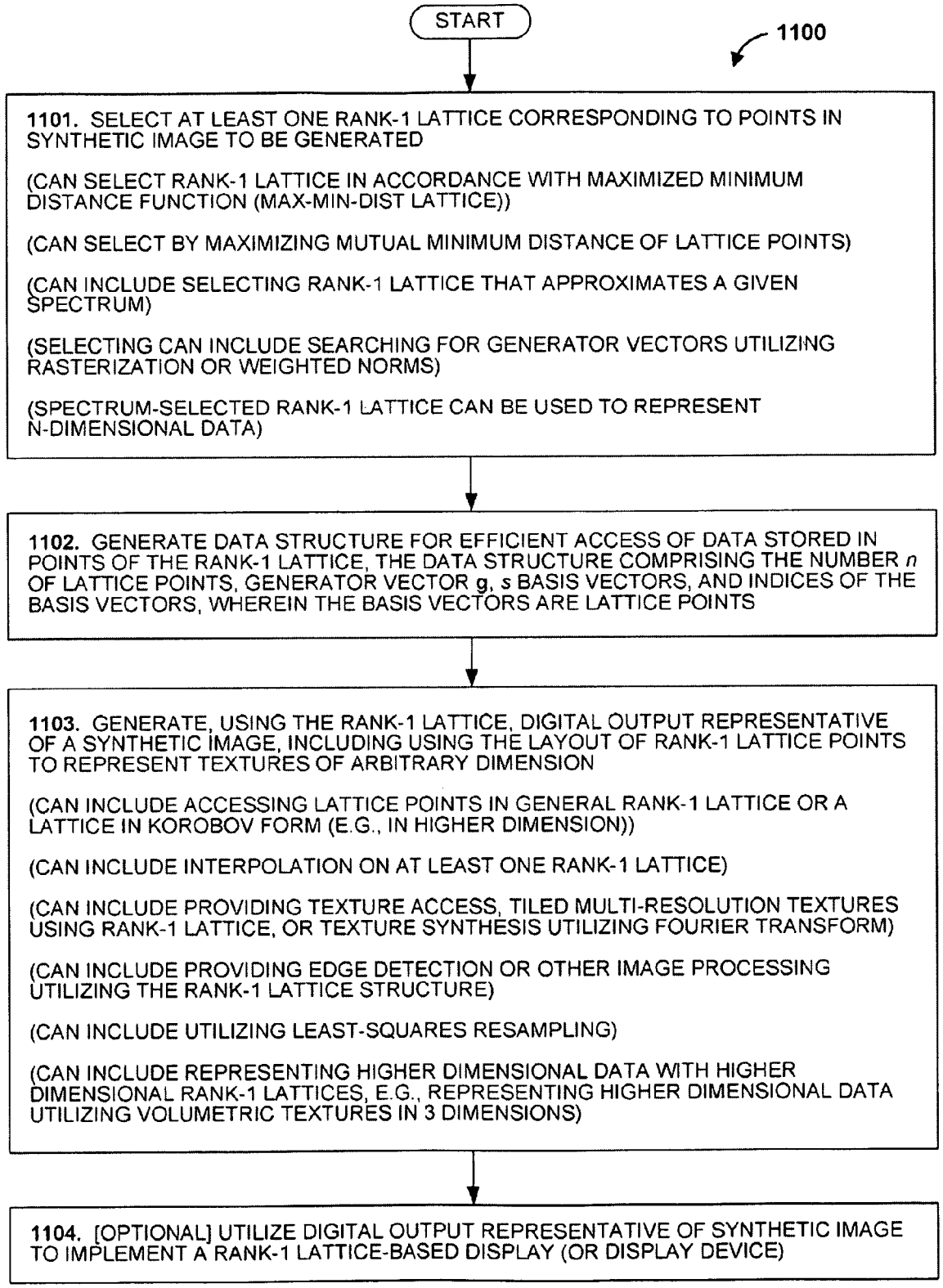
FIG. 27 is a flowchart of a general technique according to the invention.

FIG. 27 is a flowchart of a general technique 1100 according to various aspects of the invention described above. The technique 1100 includes the following components:

Box 1101: Select at least one rank-1 lattice corresponding to points in synthetic image to be generated. This can include one or more of the following: select rank-1 lattice in accordance with maximized minimum distance function (max-min-dist lattice); select by maximizing mutual minimum distance of lattice points; selecting a rank-1 lattice that approximates a given spectrum; searching for generator vectors utilizing rasterization or weighted norms; and/or using a spectrum-selected rank-1 lattice to represent n-dimensional data.

Box 1102: Generate data structure for efficient access of data stored in points of the rank-1 lattice, the data structure comprising the number n of lattice points, generator vector g, s basis vectors, and indices of the basis vectors, wherein the basis vectors are lattice points.

Box 1103: Generate, using the rank-1 lattice, digital output representative of a synthetic image, including using the layout of rank-1 lattice points to represent textures of arbitrary dimension. This can include one or more of the following: accessing lattice points in general rank-1 lattice or a lattice in Korobov form (e.g., in higher dimension);

interpolation on at least one rank-1 lattice; providing texture access, tiled multi-resolution textures using a rank-1 lattice, or texture synthesis utilizing Fourier transforms; providing edge detection or other image processing utilizing the rank-1 lattice structure; least-squares re-sampling; and/or representing higher dimensional data with higher dimensional rank-1 lattices, e.g., representing higher dimensional data utilizing volumetric textures in 3 dimensions.

Box 1104 (optional): Utilize digital output representative of synthetic image to implement a rank-1 lattice-based display (or display device).

9. Conclusions

There have been described herein systems and techniques for image and texture representation, which easily can be integrated in ray tracing and real-time rendering systems. For that purpose, there was introduced an addressing scheme based on the lattice point indices, as apparent in the rank-1 lattice definition. Thereby the natural structure of rank-1 lattices is exploited. However, neighboring lattice points are not necessarily neighbors in the image array as stored. The periodicity of rank-1 lattice allows for a simple tiled image representation, with the number n of lattice points per tile being independent of the original image resolution. Therefore n always can be chosen freely, according to the application need, as a power of 2 for example. For rank-1 lattices it is possible to construct image pyramids providing all resolutions of $0<n_i<n$, whereas in the HIP framework order of reduction always is a power of 7.

Thanks to a higher sampling efficiency, r1-images provide a better image quality than images on the square lattice at same storage cost. However, as there does not exist rank-1 lattice hardware at the moment, the resolution of the source image is demanded to be much larger than the target resolution to assure the quality of the resampled rank-1 lattice image by the integration approach.

For texture re-sampling and interpolation there has been described a fast construction technique for rank-1 lattice B-splines, such that the hexagonal structure of rank-1 lattices is preserved. Since the above r1-B-spline definition only represents an approximation to the correct solution, the invention can also include construction of rank-1 lattice splines in an analog hex-splines approach. It can be useful to compare the approximation described herein to the mathematically correct B-splines with respect to quality and computational intensity.

The invention can also include some or all of the following: the study of texture synthesis based on Fourier transform (which can be realized in shaders for example); the implementation of image processing techniques, such as edge detection, using the r1-image framework; the exploration of a least-squares re-sampling approach for r1-images, and the building of a prototype rank-1 lattice display device/hardware.

Also described above are systems and techniques that efficiently search for generator vectors of rank-1 lattices and sequences with important applications in computer graphics. Useful results were obtained for both image synthesis and representation. The invention can also include applications of rank-1 lattice sequences and the fast search of generator vectors for the anisotropic case.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method executable in a digital processor operable to generate a synthetic image, the method comprising:

selecting, using the processor, a rank-1 lattice corresponding to points in the synthetic image to be generated;

generating, using the processor, a data structure for access to data stored in points of the rank-1 lattice, the data structure comprising the number n of lattice points, generator vector g, s basis vectors, and indices of the basis vectors, wherein the basis vectors are lattice points; and generating, using the processor and the rank-1 lattice, digital output representative of a synthetic image, wherein generating output representative of the image comprises using the layout of rank-1 lattice points to represent textures of arbitrary dimension;

wherein the selecting of a rank-1 lattice comprises selecting the rank-1 lattice in accordance with a maximized minimum distance function.

2. The method of claim 1 further comprising selecting, using the processor, a rank-1 lattice by maximizing mutual minimum distance of lattice points.

3. The method of claim 1 further comprising accessing, using the processer, lattice points in any of a general rank-1 lattice or lattice in Korobov form.

4. The method of claim 3 wherein accessing lattice points of a lattice in Korobov form comprises accessing, using the processor, lattice points of a lattice in Korobov form in higher dimension.

5. The method of claim 1 further comprising executing interpolation, using the processor, on at least one rank-1 lattice.

6. The method of claim 1 further comprising providing, using the processor, any of texture access, tiled multi-resolution textures using rank-1 lattice, or texture synthesis utilizing Fourier transform.

7. The method of claim 1 further comprising providing, using the processor, image processing utilizing the rank-1 lattice structure, wherein the image processing comprises edge detection.

8. The method of claim 1 wherein generating output representative of the image further comprises utilizing, in the processor, least-squares resampling.

9. The method of claim 1 further comprising representing, using the processor, higher dimensional data with higher dimensional rank-1 lattices, wherein representing higher dimensional data comprises utilizing volumetric textures in 3 dimensions.

10. The method of claim 1 further comprising selecting, using the processor, a rank-1 lattice that approximates a given spectrum.

11. The method of claim 10 wherein the selecting of a rank-1 lattice comprises searching, using the processor, for generator vectors utilizing any of rasterization or weighted norms.

12. The method of claim 10 wherein the rank-1 lattice is utilized by the processor to represent n-dimensional data.

13. The method of claim 10 wherein numerical integration is executed, using the processor, utilizing spectrum-selected rank-1 lattices to enable anti-aliasing.

14. The method of claim 1 further comprising:
using the processor, utilizing the digital output representative of a synthetic image to implement a rank-1 lattice-based display device.

15. A computer program product comprising computer executable program instructions, stored in a non-transitory computer readable medium, that when executed by a computer processor operable to generate a synthetic image cause the computer processor to:
select a rank-1 lattice corresponding to points in a synthetic image to be generated;
generate a data structure for access to data stored in points of the rank-1 lattice, the data structure comprising the number n of lattice points, generator vector g, s basis vectors, and indices of the basis vectors, wherein the basis vectors are lattice points; and
generate, using the rank-1 lattice, digital output representative of the synthetic image, wherein generating output representative of the image comprises using the layout of rank-1 lattice points to represent textures of arbitrary dimension;
wherein the selecting of a rank-1 lattice comprises selecting the rank-1 lattice in accordance with a maximized minimum distance function.

16. The computer program product of claim 15 further comprising computer executable program instructions stored in the non-transitory computer readable medium, that when executed by the computer processor cause the computer processor to select a rank-1 lattice by maximizing mutual minimum distance of lattice points.

17. The computer program product of claim 15 further comprising computer executable program instructions stored in the non-transitory computer readable medium, that when executed by the computer processor cause the computer processor to access lattice points in any of a general rank-1 lattice or a lattice in Korobov form.

18. The computer program product of claim 17 wherein accessing lattice points of a lattice in Korobov form comprises accessing lattice points of a lattice in Korobov form in higher dimension.

19. The computer program product of claim 15 further comprising computer executable program instructions stored in the non-transitory computer readable medium, that when executed by the computer processor cause the computer processor to execute interpolation on at least one rank-1 lattice.

20. The computer program product of claim 15 further comprising computer executable program instructions stored in the non-transitory computer readable medium, that when executed by the computer processor cause the computer processor to provide any of texture access, tiled multi-resolution textures using rank-1 lattice, or texture synthesis utilizing Fourier transform.

21. The computer program product of claim 15 further comprising computer executable program instructions stored in the non-transitory computer readable medium, that when executed by the computer processor cause the computer processor to provide image processing utilizing the rank-1 lattice structure, wherein the image processing comprises edge detection.

22. The computer program product of claim 15 wherein generating output representative of the image further comprises utilizing least-squares resampling.

23. The computer program product of claim 15 further comprising computer executable program instructions stored in the non-transitory computer readable medium, that when executed by the computer processor cause the computer processor to represent higher dimensional data with higher dimensional rank-1 lattices, wherein representing higher dimensional data comprises utilizing volumetric textures in 3 dimensions.

24. The computer program product of claim 15 further comprising computer executable program instructions stored in the non-transitory computer readable medium, that when executed by the computer processor cause the computer processor to select a rank-1 lattice that approximates a given spectrum.

25. The computer program product of claim 24 wherein the selecting of a rank-1 lattice comprises searching for generator vectors utilizing any of rasterization or weighted norms.

26. The computer program product of claim 24 wherein the rank-1 lattice is utilized to represent n-dimensional data.

27. The computer program product of claim 24 further comprising computer executable program instructions stored in the non-transitory computer readable medium, that when executed by the computer processor cause the computer processor to execute numerical integration utilizing spectrum-selected rank-1 lattices to enable anti-aliasing.

28. The computer program product of claim 15 further comprising computer executable program instructions stored in the non-transitory computer readable medium, that when executed by the computer processor cause the computer processor to utilize the digital output representative of a synthetic image to implement a rank-1 lattice-based display device.

29. A processor, operable in a digital processing system operable to generate synthetic images, the processor comprising:
- lattice selection circuit elements that operate to select a rank-1 lattice corresponding to points in the synthetic image to be generated;
- first generating circuit elements that operate to generate a data structure for access to data stored in points of the rank-1 lattice, the data structure comprising the number n of lattice points, generator vector g, s basis vectors, and indices of the basis vectors, wherein the basis vectors are lattice points; and
- second generating circuit elements that operate to generate, using the rank-1 lattice, digital output representative of a synthetic image, wherein generating output representative of the image comprises using the layout of rank-1 lattice points to represent textures of arbitrary dimension;
- wherein the lattice selection circuit elements operate to select the rank-1 lattice in accordance with a maximized minimum distance function.

30. The processor of claim 29 wherein the lattice selection circuit elements operate to select a rank-1 lattice by maximizing mutual minimum distance of lattice points.

31. The processor of claim 29 further comprising a circuit elements that operate to access lattice points in any of a general rank-1 lattice or a lattice in Korobov form.

32. The processor of claim 31 wherein the circuit elements that operate to access lattice points of a lattice in Korobov form comprise circuit elements that operate to access lattice points of a lattice in Korobov form in higher dimension.

33. The processor of claim 29 further comprising circuit elements that operate to execute interpolation on at least one rank-1 lattice.

34. The processor of claim 29 further comprising circuit elements that operate to provide any of texture access, tiled multi-resolution textures using rank-1 lattice, or texture synthesis utilizing Fourier transforms.

35. The processor of claim 29 further comprising circuit elements that operate to provide image processing utilizing the rank-1 lattice structure, wherein the image processing comprises edge detection.

36. The processor of claim 29 wherein the circuit elements that operate to generate output representative of the image further comprise circuit elements that operate to utilize least-squares resampling.

37. The processor of claim 29 further comprising circuit elements that operate to represent higher dimensional data with higher dimensional rank-1 lattices, wherein the circuit elements that operate to represent higher dimensional data comprise circuit elements that operate to utilize volumetric textures in 3 dimensions.

38. The processor of claim 29 further comprising circuit elements that operate to select a rank-1 lattice that approximates a given spectrum.

39. The processor subsystem of claim 38 wherein the circuit elements that operate to select the rank-1 lattice that approximates a given spectrum are operable to search for generator vectors utilizing any of rasterization or weighted norms.

40. The processor of claim 38 wherein the rank-1 lattice is utilized to represent n-dimensional data.

41. The processor of claim 38 further comprising circuit elements that operate to execute numerical integration utilizing spectrum-selected rank-1 lattices to enable anti-aliasing.

42. The processor of claim 29 further comprising:
- circuit elements that operate to utilize the digital output representative of a synthetic image to implement a rank-1 lattice-based display device.

* * * * *